United States Patent
Choi

(10) Patent No.: US 12,039,184 B2
(45) Date of Patent: *Jul. 16, 2024

(54) APPARATUS AND METHOD FOR PERFORMING GARBAGE COLLECTION IN A MEMORY SYSTEM

(71) Applicant: SK hynix Inc., Gyeonggi-do (KR)

(72) Inventor: Hyoung Pil Choi, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 18 days.

This patent is subject to a terminal disclaimer.

(21) Appl. No.: 17/899,215

(22) Filed: Aug. 30, 2022

(65) Prior Publication Data

US 2022/0413738 A1    Dec. 29, 2022

Related U.S. Application Data

(63) Continuation of application No. 16/995,295, filed on Aug. 17, 2020, now Pat. No. 11,429,307.

(30) Foreign Application Priority Data

Mar. 3, 2020    (KR) .......................... 10-2020-0026589

(51) Int. Cl.
G06F 3/06    (2006.01)

(52) U.S. Cl.
CPC .......... *G06F 3/0652* (2013.01); *G06F 3/0608* (2013.01); *G06F 3/0673* (2013.01)

(58) Field of Classification Search
CPC ..... G06F 3/0652; G06F 3/0608; G06F 3/0673
See application file for complete search history.

(56) References Cited

U.S. PATENT DOCUMENTS 11,429,307 B2 *    8/2022    Choi ................... G06F 3/0652

\* cited by examiner

Primary Examiner — Edward J Dudek, Jr.
(74) Attorney, Agent, or Firm — IP & T GROUP LLP

(57) ABSTRACT

A memory system includes a memory device and a controller. The memory device includes a plurality of memory blocks, wherein the plurality of memory blocks includes one or more first memory blocks, each storing at least invalid data and one or more second memory blocks, each of which is blank. The controller is configured to determine a time or a period for performing garbage collection to secure an additional second memory block based at least on a transition speed representing a speed in which the second memory blocks is converted to the first memory blocks, the transition speed being determined based on a change between a first count of the first memory blocks and a second count of the second memory blocks.

20 Claims, 10 Drawing Sheets

APPARATUS AND METHOD FOR PERFORMING GARBAGE COLLECTION IN A MEMORY SYSTEM

CROSS-REFERENCE TO RELATED APPLICATION

This patent application is a continuation of U.S. patent application Ser. No. 16/995,295 filed on Aug. 17, 2020, which claims the benefit of Korean Patent Application No. 10-2020-0026589, filed on Mar. 3, 2020, the entire disclosure of which is incorporated herein by reference.

TECHNICAL FIELD

This disclosure relates to a memory system, and more particularly, to an apparatus and a method for performing garbage collection (GC) in the memory system.

BACKGROUND

Recently, a paradigm for a computing environment has shifted to ubiquitous computing, which enables computer systems to be accessed virtually anytime and everywhere. As a result, the use of portable electronic devices, such as mobile phones, digital cameras, notebook computers, and the like, are rapidly increasing, Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device using a nonvolatile semiconductor memory device is advantageous in that it has excellent stability and durability because it has no mechanical driving part (e.g., a mechanical arm), and has high data access speed and low power consumption. In the context of a memory system having such advantages, an exemplary data storage device includes a USB (Universal Serial Bus) memory device, a memory card having various interfaces, a solid state drive (SSD), or the like.

BRIEF DESCRIPTION OF THE DRAWINGS

The description herein makes reference to the accompanying drawings wherein like reference numerals refer to like parts throughout the figures.

Figure 1:
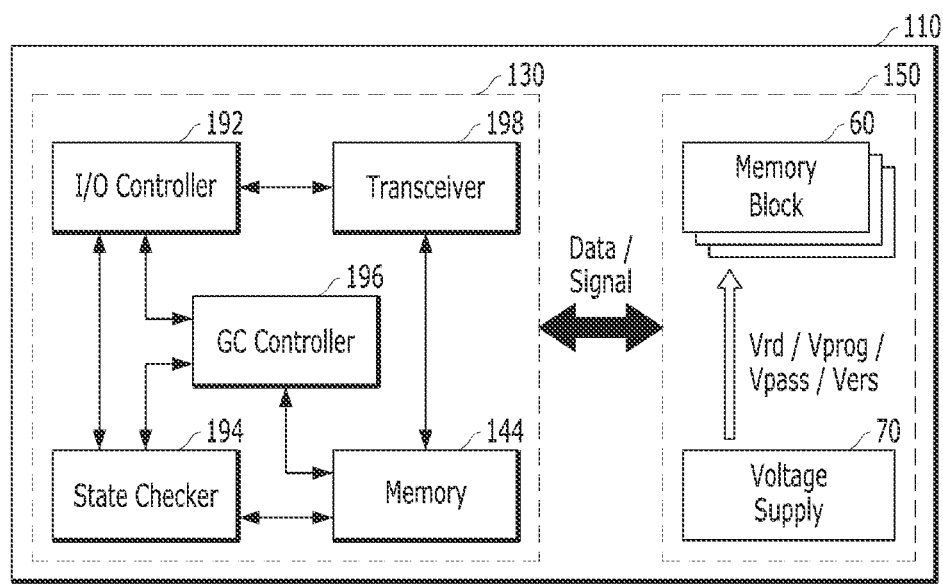
FIG. 1 illustrates a memory system according to an embodiment of the disclosure.

In this disclosure, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or might not necessarily be combined in the same embodiments.

DETAILED DESCRIPTION

Various embodiments of the disclosure are described below with reference to the accompanying drawings, Elements and features of the disclosure, however, may be configured or arranged differently to form other embodiments, which may be variations of any of the disclosed embodiments.

In this disclosure, the terms "comprise," "comprising," "include," and "including" are open-ended. As used herein, these terms specify the presence of the stated elements/components and do not preclude the presence or addition of one or more other elements/components.

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the unit/circuit/component can be said to be configured to perform the task even when the specified blocks/unit/circuit/component is not currently operational (e.g., is not on). The blocks/units/circuits/components used with the "configured to" language include hardware—for example, circuits, memory storing program instructions executable to implement the operation, etc. Reciting that a block/unit/circuit/component is "configured to" perform one or more tasks is expressly intended not to invoke 35 U.S.C. § 112, sixth paragraph, for that block/unit/circuit/component, Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

As used in the disclosure, the term 'circuitry' refers to any and all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" also covers an implementation of merely a processor (or multiple processors) or portion of a processor and its (or their) accompanying software and/or firmware. The term "circuitry" also covers, for example, and if applicable to a particular claim element, an integrated circuit for a storage device.

As used herein, these terms "first," "second," "third," and so on are used as labels for nouns that they precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination, That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

An embodiment of the disclosure can provide a data process system and a method for operating the data processing system, which includes components and resources such as a memory system and a host and is capable of dynamically allocating plural data paths used for data communication between the components based on usages of the components and the resources.

An embodiment of this disclosure can provide a method and an apparatus for performing garbage collection (GC) in a memory system. When there is insufficient space to store new data in the memory system, the memory system may perform the garbage collection (GC) to secure a memory block capable of storing new data. As a condition for the memory system to independently perform the garbage collection (GC) are more specified or clarified, a space (e.g., a free block) in which the memory system can store new data may be stably secured. According to an embodiment, if the memory system stably secures enough space to store new data, a possibility that the memory system performs the garbage collection (GC) to secure a space directly before, or during, a program operation (or continuous program operations) with a large amount of data may be reduced, so that input/output (I/O) performance of the memory system can be improved.

In addition, according to an embodiment, when the memory system performs the garbage collection (GC) even though there is sufficient space to store new data, resources of the memory system may be unnecessarily consumed and overhead may occur in data input/output operations. As the conditions for independently performing the garbage collection (GC) performed by the memory system are more specified or clarified, it is possible to reduce or avoid unnecessary garbage collection (GC) that may be performed in the memory system, thereby improving the operating efficiency of the memory system.

In an embodiment, a memory system can include a memory device including a plurality of memory blocks, wherein the plurality of memory blocks includes one or more first memory blocks, each storing at least invalid data and one or more second memory blocks, each of which is blank; and a controller configured to determine a time or a period for performing garbage collection to secure an additional second memory block based at least on a transition speed representing a speed in which the second memory blocks is converted to the first memory blocks, the transition speed being determined based on a change between a first count of the first memory blocks and a second count of the second memory blocks.

The controller can be configured to determine an operation mode based on the first count. The controller can be configured to determine the time or period for performing the garbage collection, based on the speed, when the operation mode is determined as a second mode.

The controller can be configured to determine the operation mode as the second mode when the first count is greater than or equal to a threshold. The controller can be configured to determine the operation mode as a first mode when the first count is less than the threshold.

The controller can be configured to determine the time or period for performing the garbage collection based on a difference between the threshold and a minimum requirement regarding the second memory blocks.

The controller can be configured to determine the time or period for performing the garbage collection based on a set ratio of resources employed by the controller, when the operation mode is a first mode.

The controller can be configured to determine, in the first mode, whether to perform the garbage collection based on a count of memory blocks, each of which has a ratio of valid pages less than a set reference among the first memory blocks.

The set ratio of resources can be determined based on a ratio between a first estimate of time to perform an operation by the controller in response to a request input from an external device and a second estimate time to perform the garbage collection.

The controller can be configured to determine the time or period for performing the garbage collection to make a speed of securing the additional second memory block slower than the transition speed, in the second mode, when the second count is larger than a minimum requirement regarding the second memory blocks.

The controller can be configured to determine the time or period for performing the garbage collection to make a speed of securing the additional second memory block faster than the transition speed, when the second count is less than a minimum requirement regarding the second memory blocks.

The controller can be configured to determine the time or period for performing the garbage collection to substantially match a speed of securing the additional second memory block with the transition speed, in the second mode, when the second count is equal to a minimum requirement regarding the second memory blocks.

In another embodiment, a method for operating a memory system may include checking a first count of one or more first memory blocks and a second count of one or more second memory blocks of a plurality of memory blocks in a memory device, wherein each of the first memory blocks stores at least invalid data and each of the second memory blocks is blank; checking a transition speed representing a speed in which the second memory blocks is converted to the first memory blocks, the transition speed being determined based on a change between the first count and the second count; and determining a time or period for performing garbage collection to secure an additional second memory block based at least on the transition speed.

The method can further include determining an operation mode based on the first count. The time or period for performing the garbage collection is determined based on the speed when the operation mode is determined as a second mode.

The determining the operation mode can include determining the operation mode as the second mode when the first count is greater than or equal to a threshold; and determining the operation mode as a first mode when the first count is less than the threshold.

The time or period for performing the garbage collection is determined based on a difference between the threshold and a minimum requirement regarding the second memory blocks.

The time or period for performing the garbage collection is determined based on a set ratio of resources employed by the controller, when the operation mode is a first mode.

The method further includes determining, in the first mode, whether to perform the garbage collection based on a count of memory blocks, each of which has a ratio of valid pages less than a set reference among the first memory blocks.

The set ratio of resources is determined based on a ratio between a first estimate of time to perform an operation by the controller in response to a request input from an external device and a second estimate time to perform the garbage collection.

The time or period for performing the garbage collection is determined to make a speed of securing the additional second memory block slower than the transition speed, in the second mode, when the second count is larger than a minimum requirement regarding the second memory blocks.

The time or period for performing the garbage collection is determined to make a speed of securing the additional second memory block faster than the transition speed, in the second mode, when the second count is less than a minimum requirement regarding the second memory blocks.

The time or period for performing the garbage collection is determined to substantially match a speed of securing the additional second memory block with the transition speed, in the second mode, when the second count is equal to a minimum requirement regarding the second memory blocks.

In another embodiment, an operating method of a controller can include detecting, when a number of dirty blocks is less than a first threshold, a number of dirty blocks transitioned from free blocks in each of multiple periods of time; and adjusting an operation time of a garbage collection operation on the dirty blocks based on a gradient of the detected numbers for a set number of the multiple periods of time.

The adjusting can include shortening the operation time as the gradient increases.

The adjusting can be performed based on a number of currently remaining free blocks for the set number of the periods.

The adjusting can include shortening the operation interval as the number of currently remaining free blocks decreases.

The operation time can be further shortened when the number of currently remaining free blocks becomes less than a second threshold.

Embodiments of the disclosure are described below with reference to the accompanying drawings, wherein like numbers reference like elements.

FIG. 1 illustrates a memory system according to an embodiment of the disclosure.

Referring to FIG. 1, a memory system 110 may include a memory device 150 and a controller 130. The memory device 150 and the controller 130 in the memory system 110 may be considered physically separate components or elements. The memory device 150 and the controller 130 may be connected via at least one data path. For example, the data path may include a channel and/or a way.

According to an embodiment, the memory device 150 and the controller 130 may be physically integrated but separate in terms of functionality. Further, according to an embodiment, the memory device 150 and the controller 130 may be implemented with a single chip or a plurality of chips.

The memory device 150 may include a plurality of memory blocks 60. The memory block 60 may include a group of non-volatile memory cells from which data is removed together in a single erase operation. Although not illustrated, the memory block 60 may include a page which is a group of non-volatile memory cells into which data is programmed together in a single program operation or from which data is output together in a single read operation. For example, one memory block 60 may include a plurality of pages.

Although not shown in FIG. 1, the memory device 150 may include a plurality of memory planes and/or a plurality of memory dies. According to an embodiment, a memory plane may be considered a logical or a physical partition including at least one memory block 60, a driving circuit capable of controlling an array of non-volatile memory cells, and a buffer that can temporarily store data input to, or output from, the non-volatile memory cells.

In addition, according to an embodiment, a memory die may include at least one memory plane. The memory die may be a set of components implemented on a physically distinguishable substrate. Each memory die may be connected to the controller 130 through a data path. Each memory die may include an interface to exchange data and a signal with the controller 130.

According to an embodiment, the memory device 150 may include at least one memory block 60, at least one memory plane, or at least one memory die. The internal configuration of the memory device 150 shown in FIG. 1 may be different according to performance specifications of the memory system 110, The invention is not limited to the internal configuration shown in FIG. 1.

Referring to FIG. 1, the memory device 150 may include a voltage supply circuit 70 capable of supplying at least one voltage to the memory block 60. The voltage supply circuit 70 may supply a read voltage Vrd, a program voltage Vprog, a pass voltage Vpass, and/or an erase voltage Vers to a non-volatile memory cell in the memory block 60. For example, during a read operation for reading data stored in the non-volatile memory cell in the memory block 60, the voltage supply circuit 70 may supply the read voltage Vrd to a selected non-volatile memory cell, During the program operation for storing data in the non-volatile memory cell, the voltage supply circuit 70 may supply the program voltage Vprog to a selected non-volatile memory cell. Also, during a read operation or a program operation performed on the selected non-volatile memory cell, the voltage supply circuit 70 may supply a pass voltage Vpass to non-selected non-volatile memory cells, During the erasing operation for erasing data stored in the non-volatile memory cell in the memory block 60, the voltage supply circuit 70 may supply the erase voltage Vers to the memory block 60.

An erase operation for erasing data stored in the memory device 150 may be performed on a block-by-block basis. The memory block 60 may be a group of memory cells erased together. On the other hand, a read operation for reading data stored in the memory device 150 or a program operation for storing data in the memory device 150 may be performed on a page-by-page basis. The page, which is smaller than the memory block 60, may be a group of memory cells programed or read together, Unlike a volatile memory cell in DRAM or SRAM, it is difficult to simply overwrite a piece of data in a non-volatile memory cell in the memory block 60. It is possible to program data multiple times without performing an erase operation on the non-volatile memory cells. But, for programming data multiple times, the controller 130 needs to record and manage additional and separate information regarding the non-volatile memory cells.

Plural pieces of data may be stored in each of the plurality of memory blocks 60, When a piece of data is updated with a new piece of data or is no longer needed, the corresponding piece of data may become invalid. Even if some pieces of data stored in each of the plurality of memory block 60 are invalid, other pieces of data stored in each of the plurality of memory block 60 may still be valid. Because the erase operation is performed on a block-by-block basis as described above, it may be difficult to effectively use an area (i.e., some non-volatile memory cells in a memory block 60) in which invalid data remains to program other data until an erase operation is performed on the memory block 60. As plural data input/output operations are performed in the memory system 110, areas in which invalid data are stored in each of the plurality of memory blocks 60 in the memory device 150 may increase because invalid data may occur. If this situation is left unattended, the plurality of memory blocks 60 in the memory device 150 might not be effectively used. The controller 130 may check the state of the memory device 150 and perform garbage collection (GC) to improve performance of the memory system 110.

The garbage collection (GC) performed by the controller 130 may include a process for preparing a memory block to program new data by searching for an area, which is no longer usable or no longer needed among dynamically allocated memory areas, and erasing data left in the area, A time required to erase data in a specific area in the non-volatile memory device 150 may vary according to structures or characteristics of non-volatile memory cells in the memory device 150. Further, according to an embodiment, a time required to search for an area to be erased in the non-volatile memory device 150 may vary depending on a method and an apparatus for operating or controlling the non-volatile memory device 150. For example, the garbage collection (GC) may include a procedure for selecting a target memory block to be erased among the plurality of memory blocks 60 in the memory device 150, copying valid data in the selected memory block to another memory block, updating map information associated with copied data, and performing an erase operation on the selected memory block.

According to an embodiment, the garbage collection (GC) may be a manual garbage collection (Manual GC) performed in response to a request input received from an external device or an automatic garbage collection (Auto GC) performed independently without any external request input. Because the manual garbage collection is performed by the memory system 110 in response to the request input from an external device, the manual garbage collection might not result in overhead in view of operational performance of the memory system 110. However, the automatic garbage collection, which is performed without intervention of the external device, results in overhead in terms of operational performance of the memory system 110. Due to this reason, it is desirable that a time or a period for the garbage collection in the memory system 110 is determined to reduce or avoid performance drop of the memory system 110.

For example, the garbage collection (GC) may be performed when the memory system 110 is in an idle state. When the garbage collection (GC) is performed in the idle state, no data I/O operations are performed in response to requests (e.g., read/write/erase requests, etc.) input from an external device, Thus, the garbage collection GC does not affect a performance of data I/O operations in the memory system 110. However, the memory system 110 might not know or predict how long an idle state will last. Further, when power of the memory system 110 is cut off or limitedly supplied in a hibernation mode or a power-saving mode, it may be difficult for the controller 130 to perform or complete the garbage collection (GC). When the garbage collection (GC) is suspended, delayed, or stopped for various reasons, the memory system 110 may have difficulty securing a space (e.g., a free block) for storing new data. When garbage collection (GC) is performed directly before a program operation corresponding to a write request because there is insufficient space to program new data corresponding to the write request, the corresponding program operation may be delayed so that the data input/output performance (e.g., I/O throughput) of the memory system 110 may deteriorate. In order to avoid deterioration of the data input/output performance (e.g., I/O throughput) of the memory system 110, the controller 130 may include an apparatus and a method for determining a time or a period for the garbage collection (GC).

In response to a request input from the external device, the controller 130 may perform a data input/output operation. For example, when the controller 130 performs a read operation corresponding to a read request input from the external device, data stored in a plurality of non-volatile memory cells included in the memory device 150 may be transferred to the controller 130, For the read operation, the input/output (I/O) controller 192 may transmit a read command to the memory device 150 through a transceiver 198. The transceiver 198 may transmit the read command to the memory device 150 and receive data output from the memory device 150. The transceiver 198 may store the data output from the memory device 150 in the memory 144. The input/output (I/O) controller 192 may output the data stored in the memory 144 to the external device, as a response of the read request.

In addition, the input/output controller 192 may transmit data, input along with a write request from the external device, to the memory device 150 through the transceiver 198. After storing the data in the memory device 150, the input/output controller 192 may transmit to the external device a response of the write request, which shows that the data is successfully programmed.

When the input/output controller 192 performs a data input/output operation, an operation state checker 194 may collect information regarding the plurality of memory blocks 60 in the memory device 150, For example, the operation state checker 194 may classify each of the plurality of memory blocks 60 as a first memory block in which data is stored, or as a second memory block which is blank (no data is written), Specifically, the plurality of memory blocks 60 may be classified into a free block storing no data, an open block which has been used for a program operation and includes at least one blank or empty page, and a closed block in which data is programmed on all pages and new data might not be programmed without an erase operation. As the data input/output operations such as a program operation are performed, at least one piece of data in a closed block may become invalid. The closed block that has at least one piece of invalid data is hereinafter referred to as a dirty block.

The operation state checker 194 may recognize and store operational states regarding the plurality of memory blocks 60 in the memory device 150. The operation state checker 194 may calculate a ratio of dirty blocks to all memory blocks 60 based on the operational states. For example, when there are 100 memory blocks in the memory device 150 and the number of dirty blocks is 50, a percentage of dirty blocks is 50%. Based on the ratio of dirty blocks, the operation state checker 194 may estimate a ratio of data storage space used to store data up to a total available storage capacity of the memory device 150.

Based on the ratio of dirty blocks transmitted from the operation state checker 194, a garbage collection controller 196 may determine an operation mode for performing the garbage collection. For example, when the garbage collection controller 196 determines that the number of memory blocks (e.g., free blocks) capable of storing new data in the memory device 150 is sufficient based on the percentage of dirty blocks, the garbage collection controller 196 does not have to perform the garbage collection immediately. On the other hand, when the garbage collection controller 196 determines that most of the memory blocks in the memory device 150 are used to store data and the number of memory blocks capable of storing new data is insufficient, the garbage collection is to be performed as soon as possible.

According to an embodiment, the garbage collection controller 196 may select or determine one of a plurality of operation modes regarding an interval for performing the garbage collection, based on the percentage of dirty blocks. For example, if the percentage of dirty blocks is lower than a reference, the garbage collection controller 196 may determine that the memory device 150 includes sufficient memory blocks in which no data is stored among the plurality of memory blocks 60. In this case, the garbage collection controller 196 may determine a first mode of the plurality of operation modes under which to perform garbage collection. In the first mode, the garbage collection may be performed by a set percentage of resources in or under the control of the controller 130 or the memory system 110. That is, the memory system 110 may allocate limited resources for the garbage collection. The resources of the controller 130 or the memory system 110 may be first allocated for data input/output operations. However, when resources of the controller 130 or the memory system 110 are allocated only for data input/output operations, the garbage collection may be delayed. Therefore, in the first mode, some of resources (for example, 5 to 10% of resources) employed by the controller 130 or the memory system 110 can be allocated to perform the garbage collection, so that it could be avoided that the garbage collection is delayed unsurely.

On the other hand, if the ratio of dirty blocks is higher than the reference, the garbage collection controller 196 may determine that available memory blocks, among the plurality of memory blocks 60, in which no data is stored, is likely to be insufficient soon. In this case, the controller 130 may determine that there is a high need to secure a free block through the garbage collection, as compared to the first mode. Accordingly, the garbage collection controller 196 can determine to operate in a second mode of the plurality of operation modes. In the second mode, the garbage collection controller 196 may determine a time or a period for performing the garbage collection to secure a new free block, based on a count of dirty blocks converted from free blocks or a speed in which a free block converts to a dirty block, which can be recognized by the operation state checker 194. For example, when it is detected that a single free block has been converted into a dirty block, the garbage collection controller 196 may determine a time or a period of triggering the garbage collection in order to secure a single free block. As another example, when it is detected that four free blocks have been converted into dirty blocks, the garbage collection controller 196 may determine a time or a period of triggering or performing the garbage collection to secure four new free blocks. According to an embodiment, the garbage collection controller 196 may secure an operation margin for the garbage collection or allocate some resources for the garbage collection to achieve a target number of free blocks. As the number of free blocks to be secured increases, the memory system may put the garbage collection forward, or the period between the garbage collections may be shorter.

The garbage collection controller 196 determines the time or the period for the garbage collection in the first mode or the second mode. Based on the time or the period, the input/output controller 192 may copy valid data remaining in a specific dirty block, which is subject to an erase operation, into a free block, and then erase the specific dirty block in which no valid remains to secure a new free block. The input/output controller 192 may alternately, or in parallel, perform the garbage collection and a data input/output operation corresponding to a request input from the external device. According to an embodiment, the input/output controller 192 may be implemented with a plurality of process cores or a plurality of intellectual property (IP) cores.

According to an embodiment, the input/output controller 192 the garbage collection controller 196, the operation state checker 194 shown in FIG. 1 may include individual circuitry designed to perform their own functions, or be implemented with a single chip or combined circuitry.

Hereinafter, referring to FIGS. 2 and 3, some operations performed by the memory system 110 are described in detail.

Figure 2:
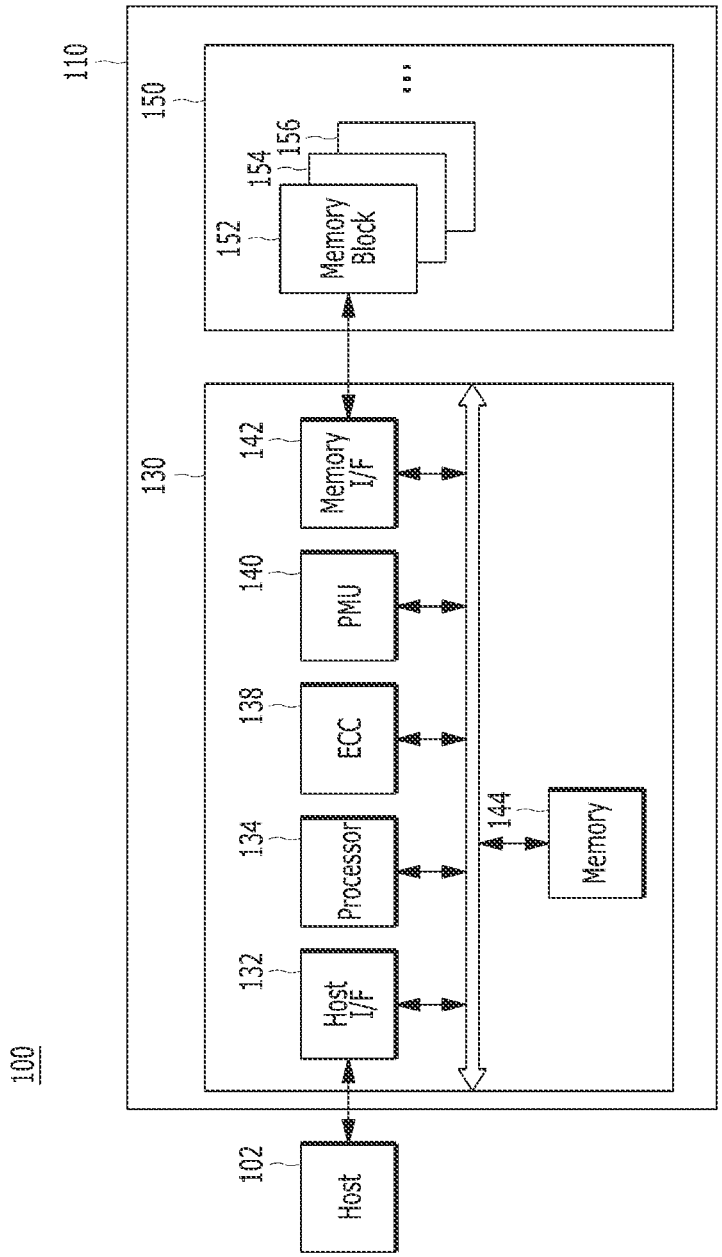
FIG. 2 illustrates a data processing system according to an embodiment of the disclosure.

Referring to FIG. 2, a data processing system 100 in accordance with an embodiment of the disclosure is described, Referring to FIG. 2, the data processing system 100 may include a host 102 engaged with, or operably coupled to, a memory system 110.

The host 102 may include, for example, a portable electronic device such as a mobile phone, an MP3 player and a laptop computer, or a non-portable electronic device such as a desktop computer, a game player, a television (TV), a projector and the like.

The host 102 also includes at least one operating system (OS), which can generally manage, and control, functions and operations performed in the host 102, The OS can provide interoperability between the host 102 engaged with the memory system 110 and the user of the memory system 110. The OS may support functions and operations corresponding to a user's requests. By way of example but not limitation, the OS can be classified into a general operating system and a mobile operating system according to mobility of the host 102. The general operating system may be split into a personal operating system and an enterprise operating system according to system requirements or a user's environment. But the enterprise operating systems can be specialized for securing and supporting high performance computing. The mobile operating system may be subject to support services or functions for mobility (e.g., a power saving function). The host 102 may include a plurality of operating systems. The host 102 may execute multiple operating systems coupled with the memory system 110, corresponding to a user's request. The host 102 may transmit a plurality of commands corresponding to the user's requests into the memory system 110, thereby performing operations corresponding to commands within the memory system 110.

The controller 130 in the memory system 110 may control the memory device 150 in response to a request or a command input from the host 102. For example, the controller 130 may perform a read operation to provide a piece of data read from the memory device 150 to the host 102, and perform a write operation (or a program operation) to store a piece of data input from the host 102 in the memory device 150, In order to perform data input/output (I/O) operations, the controller 130 may control and manage internal operations for data read, data program, data erase, or the like.

According to an embodiment, the controller 130 can include a host interface 132, a processor 134, error correction circuitry 138, a power management unit (PMU) 140, a memory interface 142, and a memory 144. Components included in the controller 130 illustrated in FIG. 2 may vary according to implementation, desired operation performance, or other characteristics or considerations the memory system 110. For example, the memory system 110 may be implemented with any of various types of storage devices, which may be electrically coupled with the host 102, according to a protocol of a host interface, Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like. As noted above, one or more components in the controller 130 may omitted or others added based on implementation of the memory system 110.

The host 102 and the memory system 110 may include a controller or an interface for transmitting and receiving a signal, a piece of data, and the like, under a specific protocol. For example, the host interface 132 in the memory system 110 may include an apparatus capable of transmitting a signal, a piece of data, and the like to the host 102 or receiving a signal, a piece of data, and the like input from the host 102.

The host interface 132 in the controller 130 may receive a signal, a command (or a request), or a piece of data input from the host 102. That is, the host 102 and the memory system 110 may use a set protocol to transmit and receive a piece of data between each other. Examples of protocols or interfaces supported by the host 102 and the memory system 110 for sending and receiving a piece of data include Universal Serial Bus (USB), Multi-Media Card (MMC), Parallel Advanced Technology Attachment (DATA), Small Computer System Interface (SCSI), Enhanced Small Disk Interface (ESDI), Integrated Drive Electronics (IDE), Peripheral Component Interconnect Express (PCIE), Serial-attached SCSI (SAS), Serial Advanced Technology Attachment (SATA), Mobile Industry Processor Interface (MIDI), and the like. According to an embodiment, the host interface 132 is a kind of layer for exchanging a piece of data with the host 102 and is implemented with, or driven by, firmware called a host interface layer (HIL).

The Integrated Drive Electronics (IDE) or Advanced Technology Attachment (ATA), one of the interfaces for transmitting and receiving a piece of data, can use a cable including 40 wires connected in parallel to support data transmission and reception between the host 102 and the memory system 110. When a plurality of memory systems 110 are connected to a single host 102, the plurality of memory systems 110 may be divided into a master and slaves by using a position or a dip switch to which the plurality of memory systems 110 are connected. The memory system 110 set as the master may be used as the main memory device. The IDE (ATA) has evolved into Fast-ATA, ATAPI, and Enhanced IDE (EIDE).

Serial Advanced Technology Attachment (SATA) is a kind of serial data communication interface that is compatible with various ATA standards of parallel data communication interfaces which is used by Integrated Drive Electronics (IDE) devices. The 40 wires in the IDE interface can be reduced to six wires in the SATA interface. For example, 40 parallel signals for the IDE can be converted into 6 serial signals for the SATA to be transmitted between each other. The SATA has been widely used because of its faster data transmission and reception rate and less resource consumption in the host 102 used for data transmission and reception. The SATA may support connection with up to 30 external devices to a single transceiver included in the host 102, In addition, the SATA can support hot plugging that allows an external device to be attached or detached from the host 102 even while data communication between the host 102 and another device is being executed, Thus, the memory system 110 can be connected or disconnected as an additional device, like a device supported by a universal serial bus (USB) even when the host 102 is powered on. For example, in the host 102 having an eSATA port, the memory system 110 may be freely detached like an external hard disk.

The Small Computer System Interface (SCSI) is a kind of serial data communication interface used for connection between a computer, a server, and/or another peripheral device. The SCSI can provide a high transmission speed, as compared with other interfaces such as the IDE and the SATA, In the SCSI, the host 102 and at least one peripheral device (e.g., the memory system 110) are connected in series, but data transmission and reception between the host 102 and each peripheral device may be performed through a parallel data communication. In the SCSI, it is easy to connect to, or disconnect from, the host 102 a device such as the memory system 110. The SCSI can support connections of 15 other devices to a single transceiver included in host 102.

The Serial Attached SCSI (SAS) can be understood as a serial data communication version of the SCSI. In the SAS, not only the host 102 and a plurality of peripheral devices are connected in series, but also data transmission and reception between the host 102 and each peripheral device may be performed in a serial data communication scheme. The SAS can support connection between the host 102 and the peripheral device through a serial cable instead of a parallel cable, so as to easily manage equipment using the SAS and enhance or improve operational reliability and communication performance. The SAS may support connections of eight external devices to a single transceiver included in the host 102.

The Non-volatile memory express (NVMe) is a kind of interface based at least on a Peripheral Component Interconnect Express (PCIe) designed to increase performance and design flexibility of the host 102, servers, computing devices, and the like equipped with the non-volatile memory system 110. Here, the PCIe can use a slot or a specific cable for connecting the host 102, such as a computing device, and the memory system 110, such as a peripheral device. For example, the PCIe can use a plurality of pins (for example, 18 pins, 32 pins, 49 pins, 82 pins, etc.) and at least one wire (e.g. x1, x4, x8, x16, etc.), to achieve high speed data communication over several hundred MB per second (e.g. 250 MB/s, 500 MB/s, 984.6250 MB/s, 1969 MB/s, and etc.). According to an embodiment, the PCIe scheme may achieve bandwidths of tens to hundreds of Giga bits per second, A system using the NVMe can make the most of an operation speed of the non-volatile memory system 110, such as an SSD, which operates at a higher speed than a hard disk.

According to an embodiment, the host 102 and the memory system 110 may be connected through a universal serial bus (USB). The Universal Serial Bus (USB) is a kind of scalable, hot-pluggable plug-and-play serial interface that can provide cost-effective standard connectivity between the host 102 and a peripheral device such as a keyboard, a mouse, a joystick, a printer, a scanner, a storage device, a modem, a video camera, and the like. A plurality of peripheral devices such as the memory system 110 may be coupled to a single transceiver included in the host 102.

Referring to FIG. 2, the error correction circuitry 138 can correct error bits of the data to be processed in, and output from, the memory device 150, which may include an error correction code (ECC) encoder and an ECC decoder. Here, the ECC encoder can perform error correction encoding of data to be programmed in the memory device 150 to generate encoded data into which a parity bit is added and store the encoded data in memory device 150, The ECC decoder can detect and correct errors contained in data read from the memory device 150 when the controller 130 reads the data stored in the memory device 150, In other words, after performing error correction decoding on the data read from the memory device 150, the error correction circuitry 138 can determine whether the error correction decoding has succeeded and output an instruction signal (e.g., a correction success signal or a correction fail signal). The error correction circuitry 138 can use the parity bit which is generated during the ECC encoding process, for correcting error bit(s) of the read data. When the number of error bits is greater than or equal to a threshold number of correctable error bits, the error correction circuitry 138 might not correct error bits but instead may output an error correction fail signal indicating failure in correcting the error bits.

According to an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The error correction circuitry 138 may include any and all circuits, modules, systems, and/or devices for performing the error correction operation based on at least one of the above described codes.

For example, the ECC decoder may perform hard decision decoding and/or soft decision decoding to data transmitted from the memory device 150. Here, hard decision decoding can be understood as one of two methods broadly classified for error correction. The hard decision decoding may include an operation of correcting an error by reading digital data of '0' or '1' from a non-volatile memory cell in the memory device 150. Because the hard decision decoding handles a binary logic signal, design and/or configuration of a circuit or algorithm for performing such decoding may be simple and processing speed may be faster than the soft decision decoding.

The soft decision decoding may quantize a threshold voltage of a non-volatile memory cell in the memory device 150 by two or more quantized values (e.g., multiple bit data, approximate values, an analog value, and the like) to correct an error based on the two or more quantized values. The controller 130 can receive two or more quantized values from a plurality of non-volatile memory cells in the memory device 150, and then perform decoding based on information generated by characterizing the quantized values as a combination of information such as conditional probability or likelihood.

According to an embodiment, the ECC decoder may use low-density parity-check and generator matrix (LDPC-GM) code among methods designed for soft decision decoding. Here, the low-density parity-check (LDPC) code uses an algorithm that can read values of data from the memory device 150 in several bits according to reliability, not simply data of 1 or 0 like hard decision decoding, and iteratively repeats it through message exchange to improve reliability of the values, and then the values are finally determined as data of 1 or 0. For example, a decoding algorithm using LDPC codes can be understood as a probabilistic decoding. In hard decision decoding a value output from a non-volatile memory cell is coded as 0 or 1. Compared to hard decision decoding, soft decision decoding can determine the value stored in the non-volatile memory cell based on the stochastic information. Regarding bit-flipping which may considered an error that can occur in the memory device 150, the soft decision decoding may provide improved probability of correcting an error and recovering data, as well as provide reliability and stability of corrected data. The LDPC-GM code may have a scheme in which internal LDGM codes can be concatenated in series with high-speed LDPC codes.

According to an embodiment, the ECC decoder may use a low-density parity-check convolutional convolutional code (LDPC-CC) among methods designed for soft decision decoding. Herein, the LDPC-CC may employ linear time encoding and pipeline decoding based on a variable block length and a shift register.

According to an embodiment, the ECC decoder may use a Log Likelihood Ratio Turbo Code (LLR-TC) among methods designed for soft decision decoding. Herein, the Log Likelihood Ratio (LLR) may be calculated as a non-linear function to obtain a distance between a sampled value and an ideal value. In addition, Turbo Code (TC) may include a simple code (for example, a Hamming code) in two or three dimensions, and repeat decoding in a row direction and a column direction to improve reliability of values.

The power management unit (PMU) 140 may control electrical power provided in the controller 130, The PMU 140 may monitor the electrical power supplied to the memory system 110 (e.g., a voltage supplied to the controller 130) and provide the electrical power to components in the controller 130. The PMU 140 can not only detect power-on or power-off, but also generate a trigger signal to enable the memory system 110 to urgently back up a current state when the electrical power supplied to the memory system 110 is unstable. According to an embodiment, the PMU 140 may include a device or a component capable of accumulating electrical power that may be used in an emergency.

The memory interface 142 may serve as an interface for handling commands and data transferred between the controller 130 and the memory device 150 to allow the controller 130 to control the memory device 150 in response to a command or a request input from the host 102. The memory interface 142 may generate a control signal for the memory device 150 and may process data input to, or output from, the memory device 150 under the control of the processor 134 in a case when the memory device 150 is a flash memory. For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 can be implemented through, or driven by, firmware called a Hash Interface Layer (FIL) as a component for exchanging data with the memory device 150.

According to an embodiment, the memory interface 142 may support an open NAND flash interface (ONFi), a toggle mode or the like for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), and a toggle double data rate (DDR).

The memory 144 may be a working memory in the memory system 110 or the controller 130, storing temporary or transactional data received or delivered for operations in the memory system 110 and the controller 130. For example, the memory 144 may temporarily store a piece of read data output from the memory device 150 in response to a request from the host 102, before the piece of read data is output to the host 102. In addition, the controller 130 may temporarily store a piece of write data input from the host 102 in the memory 144, before programming the piece of write data in the memory device 150. When the controller 130 controls operations such as data read, data write, data program, data erase or etc. of the memory device 150, a piece of data transmitted or generated between the controller 130 and the memory device 150 of the memory system 110 may be stored in the memory 144. In addition to the piece of read data or write data, the memory 144 may store information (e.g., map data, read requests, program requests, etc.) necessary for performing operations for inputting or outputting a piece of data between the host 102 and the memory device 150. According to an embodiment, the memory 144 may include a command queue, a program memory, a data memory, a write buffer/cache, a read buffer/cache, a data buffer/cache, a map buffer/cache, and the like.

In an embodiment, the memory 144 may be implemented with a volatile memory. For example, the memory 144 may be implemented with a static random access memory (SRAM), a dynamic random access memory (DRAM), or both, Although FIGS. 1 and 2 illustrate, for example, the memory 144 disposed within the controller 130, the embodiments are not limited thereto. The memory 144 may be located within or external to the controller 130. For instance, the memory 144 may be embodied by an external volatile memory having a memory interface transferring data and/or signals between the memory 144 and the controller 130.

The processor 134 may control overall operation of the memory system 110. For example, the processor 134 can control a program operation or a read operation of the memory device 150, in response to a write request or a read request input from the host 102. According to an embodiment, the processor 134 may execute firmware to control the program operation or the read operation in the memory system 110. Herein, the firmware may be referred to as a flash translation layer (FTL). An example of the FTL is later described in detail, referring to FIG. 3. According to an embodiment, the processor 134 may be implemented with a microprocessor or a central processing unit (CPU).

According to an embodiment, the memory system 110 may be implemented with at least one multi-core processor. The multi-core processor is a circuit or chip in which two or more cores, which are considered distinct processing regions, are integrated. For example, when a plurality of cores in the multi-core processor drive or execute a plurality of flash translation layers (FTLs) independently, data input/output speed (or performance) of the memory system 110 may be improved. According to an embodiment, the data input/output (I/O) operations in the memory system 110 may be independently performed through different cores in the multi-core processor.

The processor 134 in the controller 130 may perform an operation corresponding to a request or a command input from the host 102. Further, the memory system 110 may operate independently of a command or a request input from an external device such as the host 102, Typically, an operation performed by the controller 130 in response to the request or the command input from the host 102 may be considered a foreground operation, while an operation performed by the controller 130 independently (e.g., regardless the request or the command input from the host 102) may be considered a background operation. The controller 130 can perform the foreground or background operation for read, write or program, erase and the like regarding a piece of data in the memory device 150, In addition, a parameter set operation corresponding to a set parameter command or a set feature command as a set command transmitted from the host 102 may be considered a foreground operation. As a background operation without a command transmitted from the host 102, the controller 130 can perform garbage collection (GC), wear leveling (WL), bad block management for identifying and processing bad blocks, or the like may be performed, in relation to a plurality of memory blocks 152, 154, 156 included in the memory device 150.

According an embodiment, substantially similar operations may be performed as both the foreground operation and the background operation. For example, if the memory system 110 performs garbage collection in response to a request or a command input from the host 102 (e.g., Manual GC), garbage collection can be considered a foreground operation. However, when the memory system 110 performs garbage collection independently of the host 102 (e.g., Auto GC), garbage collection can be considered a background operation.

When the memory device 150 includes a plurality of dies (or a plurality of chips) including non-volatile memory cells, the controller 130 may be configured to perform parallel processing regarding plural requests or commands input from the host 102 in to improve performance of the memory system 110. For example, the transmitted requests or commands may be distributed to, and processed in parallel within, a plurality of dies or a plurality of chips in the memory device 150, The memory interface 142 in the controller 130 may be connected to a plurality of dies or chips in the memory device 150 through at least one channel and at least one way. When the controller 130 distributes and stores pieces of data in the plurality of dies through each channel or each way in response to requests or commands associated with a plurality of pages including non-volatile memory cells, plural operations corresponding to the requests or the commands can be performed simultaneously or in parallel. Such a processing method or scheme can be considered as an interleaving method. Because data input/output speed of the memory system 110 operating with the interleaving method may be faster than that without the interleaving method, data I/O performance of the memory system 110 can be improved.

By way of example but not limitation, the controller 130 can recognize the status of each of a plurality of channels (or ways) associated with a plurality of memory dies in the memory device 150. For each channel/way, the controller 130 may determine it to have a busy status, a ready status, an active status, an idle status, a normal status, and/or an abnormal status. The controller's determination of which channel or way an instruction (and/or a data) is delivered through can be associated with a physical block address, e.g., to which die(s) the instruction (and/or the data) is delivered. For such determination, the controller 130 can refer to descriptors delivered from the memory device 150. The descriptors, which are data with a specific format or structure can include a block or page of parameters that describe something about the memory device 150. For instance, the descriptors may include device descriptors, configuration descriptors, unit descriptors, and the like. The controller 130 can refer to, or use, the descriptors to determine via which channel(s) or way(s) an instruction or a data is exchanged.

Referring to FIG. 2, the memory device 150 in the memory system 110 may include the plurality of memory blocks 152, 154, 156, each of which includes a plurality of non-volatile memory cells. According to an embodiment, a memory block can be a group of non-volatile memory cells erased together. Each memory block 152, 154, 156 may include a plurality of pages which is a group of non-volatile memory cells read or programmed together. Although not shown in FIG. 2, each memory block 152, 154, 156 may have a three-dimensional stack structure for a high integration. Further, the memory device 150 may include a plurality of dies, each die including a plurality of planes, each plane including the plurality of memory blocks. Configuration of the memory device 150 may vary depending on performance of the memory system 110. The plurality of memory blocks 152, 154, 156 may be included in the plurality of memory blocks 60 shown in FIG. 1.

In the memory device 150 shown in FIG. 2, the plurality of memory blocks 152, 154, 156 are included. The plurality of memory blocks 152, 154, 156 can be any of different types of memory blocks such as a single-level cell (SLC) memory block, a multi-level cell (MLC) memory block, or the like, according to the number of bits that can be stored or represented in one memory cell. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have larger storage capacity for the same space compared to the SLC memory block. The MLC memory block can be highly integrated in a view of storage capacity. In an embodiment, the memory device 150 may be implemented with MLC memory blocks such as double level cell (DLC) memory blocks, triple-level cell (TLC) memory blocks, quadruple-level cell (QLC) memory blocks or combination thereof. The double-level cell (DLC) memory block may include a plurality of pages implemented by memory cells, each capable of storing 2-bit data. The triple-level cell (TLC) memory block can include a plurality of pages implemented by memory cells, each capable of storing 3-bit data. The quadruple-level cell (QLC) memory block can include a plurality of pages implemented by memory cells, each capable of storing 4-bit data. In another embodiment, the memory device 150 can be implemented with a block including a plurality of pages implemented by memory cells, each capable of storing five or more bits of data.

According to an embodiment, the controller 130 may use a multi-level cell (MLC) memory block in the memory device 150 as an SLC memory block that stores one-bit data in one memory cell. A data input/output speed of the multi-level cell (MLC) memory block can be slower than that of the SLC memory block. That is, when the MLC memory block is used as the SLC memory block, a margin for a read or program operation can be reduced. The controller 130 can utilize a faster data input/output speed of the multi-level cell (MLC) memory block when using the multi-level cell (MLC) memory block as the SLC memory block. For example, the controller 130 can use the MLC memory block as a buffer to temporarily store a piece of data, because the buffer may require a high data input/output speed for improving performance of the memory system 110.

Further, according to an embodiment, the controller 130 may program pieces of data in a multi-level cell (MLC) a plurality of times without performing an erase operation on a specific MLC memory block in the memory device 150. In general, non-volatile memory cells have a feature that does not support data overwrite. However, the controller 130 may use a feature in which a multi-level cell (MLC) may store multi-bit data, in order to program plural pieces of 1-bit data in the MLC a plurality of times. For MLC overwrite operation, the controller 130 may store the number of program times as separate operation information when a piece of 1-bit data is programmed in a non-volatile memory cell. According to an embodiment, an operation for uniformly levelling threshold voltages of non-volatile memory cells can be carried out before another piece of data is overwritten in the same non-volatile memory cells.

In an embodiment of the disclosure, the memory device 150 is embodied as a non-volatile memory such as a flash memory, for example, as a NAND flash memory, a NOR flash memory, and the like. Alternatively, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM), or the like.

Figure 3:
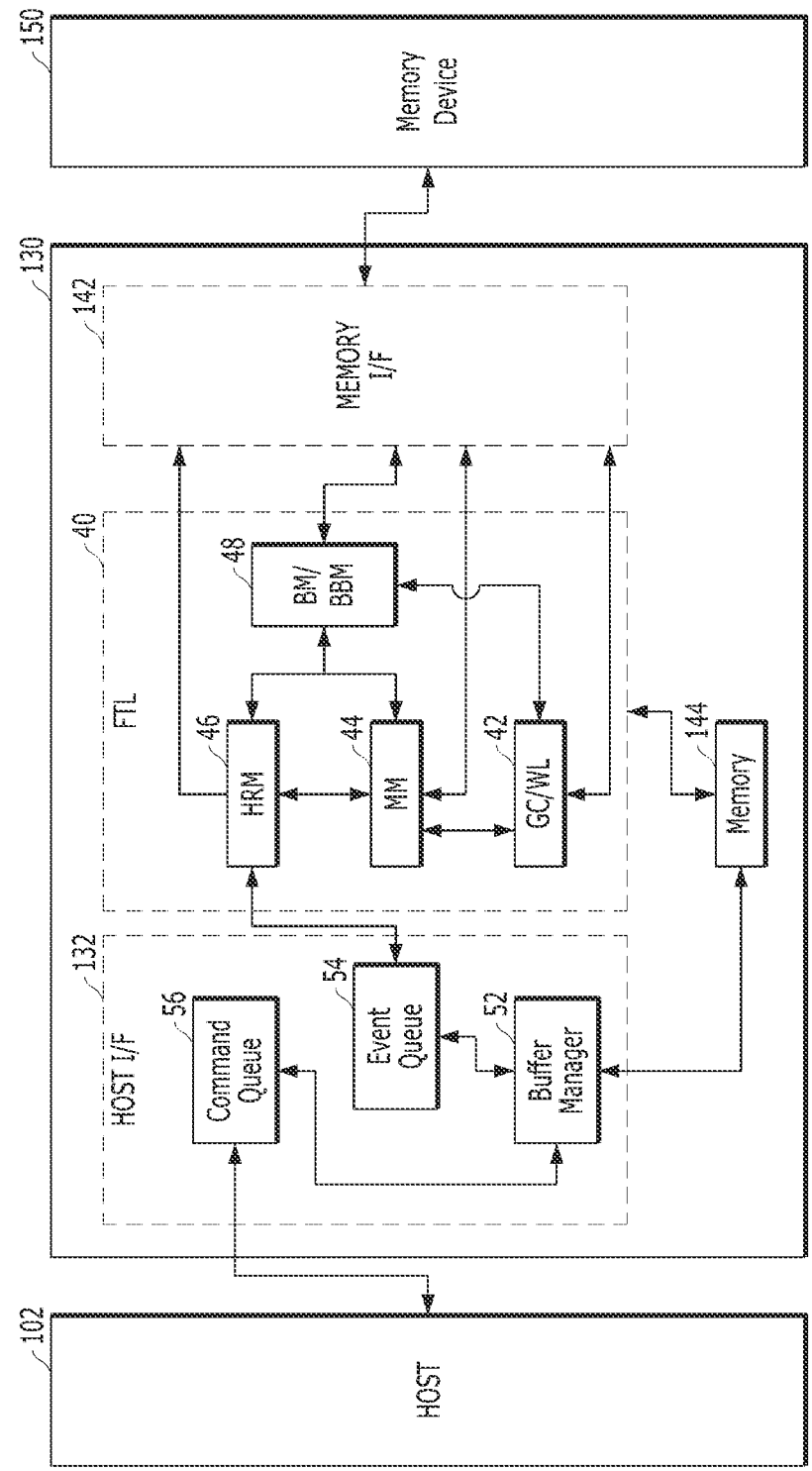
FIG. 3 illustrates a memory system according to an embodiment of the disclosure.

Referring to FIG. 3, a controller 130 in a memory system in accordance with another embodiment of the disclosure is described. The controller 130 cooperates with the host 102 and the memory device 150. As illustrated, the controller 130 includes a host interface 132, a flash translation layer (FTL) 240, as well as the host interface 132 the memory interface 142, and the memory 144 of FIG. 2.

Although not shown in FIG. 3, in accordance with an embodiment, the ECC 138 illustrated in FIG. 2 may be included in the flash translation layer (FTL) 240. In another embodiment, the ECC 138 may be implemented as a separate module, a circuit, firmware, or the like, which is included in, or associated with, the controller 130.

The host interface 132 is for handling commands, data, and the like transmitted from the host 102. By way of example but not limitation, the host interface 132 may include a command queue 56, a buffer manager 52, and an event queue 54, The command queue 56 may sequentially store commands, data, and the like received from the host 102 and output them to the buffer manager 52 in an order in which they are stored. The buffer manager 52 may classify, manage, or adjust the commands, the data, and the like, which are received from the command queue 56. The event queue 54 may sequentially transmit events for processing the commands, the data, and the like received from the buffer manager 52.

A plurality of commands or data of the same type, e.g., read or write commands, may be transmitted from the host 102, or commands and data of different types may be transmitted to the memory system 110 after being mixed or jumbled by the host 102. For example, a plurality of commands for reading data (read commands) may be delivered, or commands for reading data (read command) and programming/writing data (write command) may be alternately transmitted to the memory system 110. The host interface 132 may store commands, data, and the like, which are transmitted from the host 102, to the command queue 56 sequentially. Thereafter, the host interface 132 may estimate or predict what kind of internal operation the controller 130 will perform according to the types of commands, data, and the like, which have been received from the host 102. The host interface 132 can determine a processing order and a priority of commands, data and the like, based at least on their characteristics. According to characteristics of commands, data, and the like transmitted from the host 102, the buffer manager 52 in the host interface 132 is configured to determine whether the buffer manager should store commands, data, and the like in the memory 144, or whether the buffer manager should deliver the commands, the data, and the like into the flash translation layer (FTL) 240. The event queue 54 receives events, received from the buffer manager 52, which are to be internally executed and processed by the memory system 110 or the controller 130 in response to the commands, the data, and the like transmitted from the host 102, so as to deliver the events into the flash translation layer (FTL) 240 in the order received.

In accordance with an embodiment, the flash translation layer (FTL) 240 illustrated in FIG. 3 may work as a multi-thread scheme to perform the data input/output (I/O) operations. A multi-thread FTL may be implemented through a multi-core processor using multi-thread included in the controller 130.

In accordance with an embodiment, the flash translation layer (FTL) 240 can include a host request manager (HRM) 46, a map manager (MM) 44, a state manager 42, and a block manager 48. The host request manager (HRM) 46 can manage the events entered from the event queue 54, The map manager (MM) 44 can handle or control a map data. The state manager 42 can perform garbage collection (GC) or wear leveling (WL). The block manager 48 can execute commands or instructions on a block in the memory device 150. The state manager 42 may include the operation state checker 194 and the garbage collection controller 196 shown in FIG. 1. Although not illustrated in FIG. 3, according to an embodiment, the error correction circuitry 138 described in FIG. 2 may be included in the flash translation layer (FTL) 240. According to an embodiment, the error correction circuitry 138 may be implemented as a separate module, circuit, or firmware in the controller 130.

In addition, according to an embodiment, the flash translation layer (FTL) 240 may include the input/output controller 192 described in FIG. 1, the memory interface 142 may include the transceiver 198 described in FIG. 1.

By way of example but not limitation, the host request manager (HRM) 46 can use the map manager (MM) 44 and the block manager 48 to handle or process requests according to the read and program commands, and events which are delivered from the host interface 132. The host request manager (HRM) 46 can send an inquiry request to the map data manager (MM) 44 to determine a physical address corresponding to the logical address associated with the events. The host request manager (HRM) 46 can send a read request with the physical address to the memory interface 142, to process the read request (handle the events). On the other hand, the host request manager (HRM) 46 can send a program request (write request) to the block manager 48, to program data to a specific empty page (no data) in the memory device 150, and then, can transmit a map update request corresponding to the program request to the map manager (MM) 44 to update an item relevant to the programmed data in information for associating, or mapping, the logical-physical addresses with, or to, each other.

Here, the block manager 48 can convert a program request delivered from the host request manager (HRM) 46, the map data manager (MM) 44, and/or the state manager 42 to a flash program request used for the memory device 150 to manage flash blocks in the memory device 150, In order to maximize or enhance program or write performance of the memory system 110 (see FIG. 2), the block manager 48 may collect program requests and send flash program requests for multiple-plane and one-shot program operations to the memory interface 142. In an embodiment, the block manager 48 sends several flash program requests to the memory interface 142 to enhance or maximize parallel processing of the multi-channel and multi-directional flash controller.

On the other hand, the block manager 48 can be configured to manage blocks in the memory device 150 according to the number of valid pages, select and erase blocks having no valid pages when a free block is needed, and select a block including the least number of valid pages when it is determined that garbage collection is necessary. The state manager 42 can perform garbage collection to move the valid data to an empty block and erase the blocks from which the valid data was moved so that the block manager 48 may have enough free blocks (empty blocks with no data), If the block manager 48 provides information regarding a block to be erased to the state manager 42, the state manager 42 could check all flash pages of the block to be erased to determine whether each page is valid. For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process requests such as queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant flapping table stored in the memory device 150. When the number of dirty cache blocks in the map manager 44 exceeds a certain threshold, a program request can be sent to the block manager 48 so that a clean cache block is made and the dirty map table may be stored in the memory device 150.

On the other hand, when garbage collection is performed, the state manager 42 copies valid page(s) into a free block, and the host request manager (HRM) 46 can program the latest version of the data for the same logical address of the page and currently issue an update request. When the status manager 42 requests the map update in a state in which copying of valid page(s) is not properly completed, the map manager 44 might not perform the mapping table update. It is because the map request is issued with old physical information if the status manger 42 requests a map update and a valid page copy is completed later. The map manager 44 may perform a map update operation to ensure accuracy only if the latest map table still points to the old physical address, FIG. 4 illustrates a state machine regarding garbage collection in a memory system according to another embodiment of the disclosure.

Figure 4:
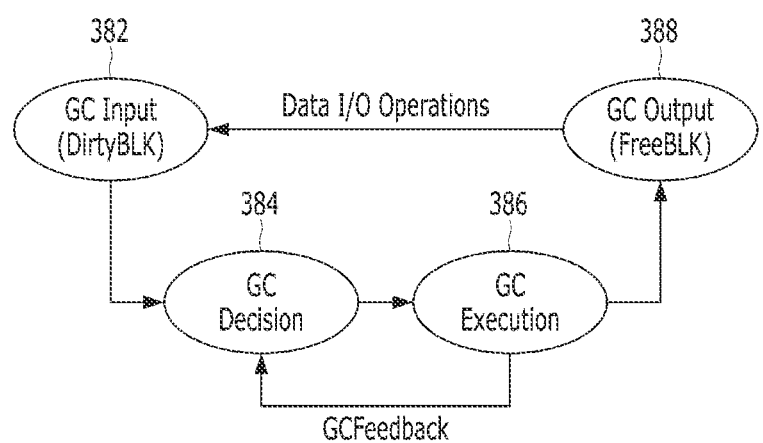
FIG. 4 illustrates a state machine regarding garbage collection in a memory system according to another embodiment of the disclosure.

Referring to FIG. 4, a state machine associated with the garbage collection performed in the memory system 110 may include four statuses 382, 384, 386, 388, First, in a garbage collection input status 382, the controller 130 may gather information regarding a count or a ratio of dirty blocks to all memory blocks 60 in the memory device 150.

In a garbage collection determination status 384, the controller 130 may determine the execution time or the execution period of the garbage collection. In this case, such time or period thereof may be determined based on a mode, which is determined according to the number or ratio of dirty blocks DirtyBLK.

In response to the execution time or the execution period for the garbage collection determined in the garbage collection determination status 384, the controller 130 may perform the garbage collection in a garbage collection execution status 386. If the execution time or period for the garbage collection is not determined in the garbage collection determination status 384, the controller 130 might not perform the garbage collection in the garbage collection execution status 386.

In a garbage collection output status 388, the controller 130 may secure a new free block FreeBLK in the memory device 150, which is obtained by the garbage collection performed in the garbage collection execution status 386.

The memory system 110 may perform data I/O operations in response to a request input from the external device. The free block FreeBLK obtained in the garbage collection output status 388 may be used to store data input along with the request, and as a result, a new dirty block DirtyBLK may occur, i.e., the free block FreeBLK is converted to a dirty block DirtyBLK. The controller 130 may collect information regarding the number or the ratio of dirty blocks DirtyBLK in the garbage collection input status 382.

According to an embodiment, a result of the garbage collection performed in the garbage collection execution status 386 may be fed back to the garbage collection determination status 384 (GCFeedback). For example, it is assumed that two free blocks FreeBLK are secured by the garbage collection. This result can be fed back to the garbage collection decision status 384. If the controller 130 determines that the two secured free blocks FreeBLK are satisfactory in the garbage collection determination status 384, the controller 130 might not determine a time or a period for executing an additional garbage collection. However, if the controller 130 determines that the two secured free blocks FreeBLK are not satisfactory in the garbage collection determination status 384, the controller 130 may determine a time or a period for the additional garbage collection.

Figure 5:
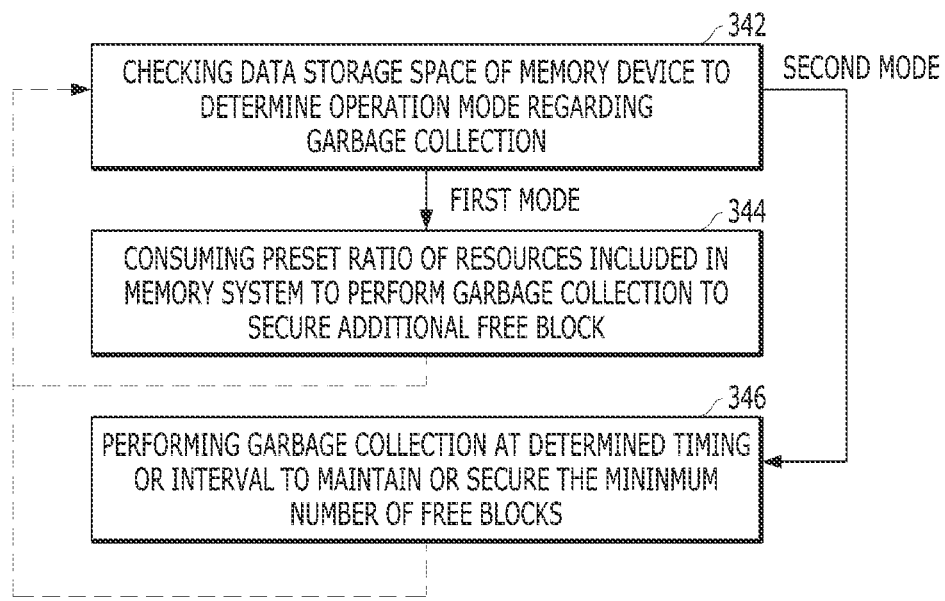
FIG. 5 illustrates a method of operating a memory system according to another embodiment of the disclosure.

FIG. 5 illustrates a method of operating a memory system according to another embodiment of the disclosure.

Referring to FIG. 5, a method for operating a memory system may include checking a data storage space of a memory device to determine an operation mode regarding garbage collection (342). The data storage space of the memory device may be distinguished from an amount of valid data stored in the memory device 150. For example, it is assumed that the memory device 150 can store 100 GB of user data. When 70 GB of user data is already stored, we can simply infer that 70% of the memory device is being used (or occupied with data). However, when at least some of 70 GB of user data is repeatedly accessed or stored in the memory device through a plurality of data input/output operations, such as a read, a program or an erase operation, it is unlikely that only 70% of the plurality of memory blocks 60 in the memory device 150 may be used to store the 70 GB of user data. For example, when invalid data is stored in some areas of used memory blocks, a ratio of used memory blocks in the memory device 150 (e.g., the data storage space of the memory device 150) may be larger (e.g., 70% or more) than a ratio of valid data stored in the memory device 150 (e.g., 70% user data of the total storage capacity).

To determine the time or period for triggering or performing the garbage collection, a count or a ratio of memory blocks used to store data in the memory device 150 is used more efficiently than an amount of user data stored in the memory device 150. According to an embodiment, the data storage space of the memory device may be identified based on information regarding an area capable of storing user data in the memory device 150. For example, a count of dirty blocks or a ratio of dirty blocks to all memory blocks 60 in the memory device 150 may be used to recognize the data storage space.

According to an embodiment, the controller 130 may determine the operation mode for performing the garbage collection based at least on various criteria, Referring to FIG. 5, there may be two operation modes for performing the garbage collection: a first mode and a second mode. For example, if a count or a ratio of memory blocks used to store data among the plurality of memory blocks 60 in the memory device 150 is less than a set criterion (number or ratio), the controller 130 may select the first mode for performing the garbage collection, Because the controller 130 determines that there are sufficient memory blocks which are not used for storing data in the memory device 150, the garbage collection in the first mode may have a lower priority than the garbage collection in the second mode. In contrast, when the count or the ratio of memory blocks used to store data among the plurality of memory blocks 60 in the memory device 150 is equal to or larger than the set criterion, the controller 130 may select the second mode for performing the garbage collection. Because the controller 130 determines that there are not sufficient memory blocks not used for storing data in the memory device 150, the garbage collection in the second mode has a higher priority than the garbage collection in the first mode.

According to an embodiment, the method for operating the memory system may include consuming a set ratio of resources in the memory system to perform the garbage collection to secure an additional free block (344). In the first mode, the garbage collection might not have a relatively high priority. However, when the garbage collection is delayed, the performance of the memory system may deteriorate later. Accordingly, in the first mode, some resources corresponding to a set ratio included in, or employed by, the memory system 110 or the controller 130 may be allocated for the garbage collection. The garbage collection may be performed gradually or little by little.

The data input/output operation and the garbage collection, which are performed by the memory system 110, may include processes of reading data stored in the memory device 150, storing data in the memory device 150, and erasing data stored in the memory device 150. According to an embodiment, the memory system 110 may dynamically allocate a ratio of resources for the data input/output operation and the garbage collection, based on a first operation margin OM_R required to read data stored in a single page, a second operation margin OM_P required to program data in a single page, and a third operation margin OM_E required to erase data stored in a single memory block which are recognized by the memory system 110.

For example, it is assumed that 100 pages of data are input along with a program request from the external device, and a first memory block in the memory device 150 stores valid data in 5 pages thereof. The controller 130 may estimate that a first time required for a first data input/output operation for programming the data in 100 pages is "100×OM_P." In addition, the controller 130 may estimate a second time spent on a first garbage collection for erasing the first memory block after copying the valid data of 5 pages in the first memory block to another memory block is "5×OM_R+ 5×OM_P+OM_E." If the controller 130 allocates resources such that the first data input/output operation and the first garbage collection start and end together, a ratio of the first time and the second time required for completing the first data input/output operation and the first garbage collection may be the same as a ratio between resources allocated for the first data input/output operation and the first garbage collection.

The controller 130 may get information regarding a plurality of data input/output operations corresponding to requests input from the external device (e.g., operation of the host interface 132 of FIG. 3), and determine a ratio of the resources allocated for the garbage collection in the first mode. According to an embodiment, the ratio of resources allocated for the garbage collection may be predetermined (e.g., 4 to 10%) through a test process or determined dynamically according to an operation state of the memory device 150. For example, the ratio of resources allocated for the garbage collection may be determined in response to an increase or a decrease (a rate of change) of dirty blocks in the memory device 150, The larger the ratio of resources allocated for the garbage collection, the larger the number of free blocks secured by the garbage collection. Using this way, the controller 130 may perform the garbage collection while performing a plurality of data input/output operations corresponding to input requests. While a memory block is used to store data by a plurality of data input/output operations, a new free block can be secured by the garbage collection.

According to an embodiment, the method for operating the memory system may include performing the garbage collection at a determined time or period to maintain or secure the minimum number of free blocks (346). The garbage collection in the second mode may have a higher priority than the garbage collection in the first mode. Because the controller 130 determines that most of the plurality of memory blocks in the memory device 150 have been already used to store data, data input/output performance of the memory system 110 may be deteriorated rapidly when a minimum number of free blocks is not secured or maintained in the second mode. According to an embodiment, in order to maintain or secure the minimum number of free blocks, the controller 130 may attempt to obtain a new free block in response to a speed of transitioning from a free block in the memory device 150 to a dirty block which is used to store data. For example, it is assumed that four memory blocks in the memory device 150 have been converted from free block status to dirty block status after the previous garbage collection had been performed. The controller 130 may perform or trigger new garbage collection to secure four new free blocks.

Also, according to an embodiment, the garbage collection performed in the second mode may be determined based on a minimum requirement regarding free blocks in the memory device 150. Here, the minimum requirement regarding free blocks may be a reference or a criterion established in advance to ensure data input/output performance of the memory system 110. When the number of free blocks in the memory device 150 does not satisfy the minimum requirement, it may be difficult to ensure operation performance (e.g., data input/output throughput) of the memory system 110, In order to maintain the operation performance of the memory system 110, the controller 130 may determine a time or period for performing the garbage collection to satisfy the minimum requirement regarding the free blocks.

For example, in the second mode, when the number of free blocks in the memory device 150 is larger than the minimum requirement (or minimum number), the controller 130 may be configured to control a time or period thereof for performing the garbage collection such that the speed of securing a new free block is slower than the speed of transitioning from a free block to a dirty block, in the second mode. When the number of free blocks is greater than the minimum requirement, the controller 130 may determine that an operation margin for securing the free blocks is sufficient. Accordingly, the controller 130 may trigger or perform the garbage collection based on the speed of transitioning from a free block to a dirty block, but a rate at which a new free block is secured may be slower than the speed of making the transition.

On the other hand, when the number of free blocks of the memory device 150 in the second mode is less than the minimum number, the controller 130 is configured to determine the time or period for performing the garbage collection such that the speed of securing an additional second memory block is faster than the speed of transitioning from a second memory block to a first memory block, in the second mode. When the number of free blocks is less than the minimum requirement, the controller 130 may determine that the operation performance of the memory system 110 is highly likely to be deteriorated soon. Accordingly, the controller 130 may trigger or perform the garbage collection based on the speed of transitioning from a free block to a dirty block, but the number of free blocks newly secured is larger than the number of dirty blocks converted from free blocks. Through such garbage collection, the minimum requirement regarding free blocks in the memory device 150 could be satisfied soon, so that deterioration of the operation performance of the memory system 110 may be avoided.

In addition, when the number of free blocks in the memory device 150 is equal to the minimum number in the second mode, the controller 130 is configured to determine the time or period for performing the garbage collection to substantially match a speed of securing a new free block with the speed of transitioning from a free block to a dirty block. Through this, the memory system 110 may maintain at least the minimum number of free blocks in the memory device 150, so that it is possible to avoid deterioration of the operation performance of the memory system 110.

When the time or period for performing the garbage collection is determined by the controller 130, the garbage collection may be performed, or not performed (delayed), in response to such determination. Subsequently (for example, after the steps 344, 346 of FIG. 5), the controller 130 may perform a process of checking the data storage space of the memory device to determine the operation mode regarding the garbage collection (342). These procedures may correspond to the feedback GCFeedback, shown in FIG. 4, for utilizing the result of the garbage collection performed in the garbage collection execution status 386 to the garbage collection determination statues 384.

Figure 6:
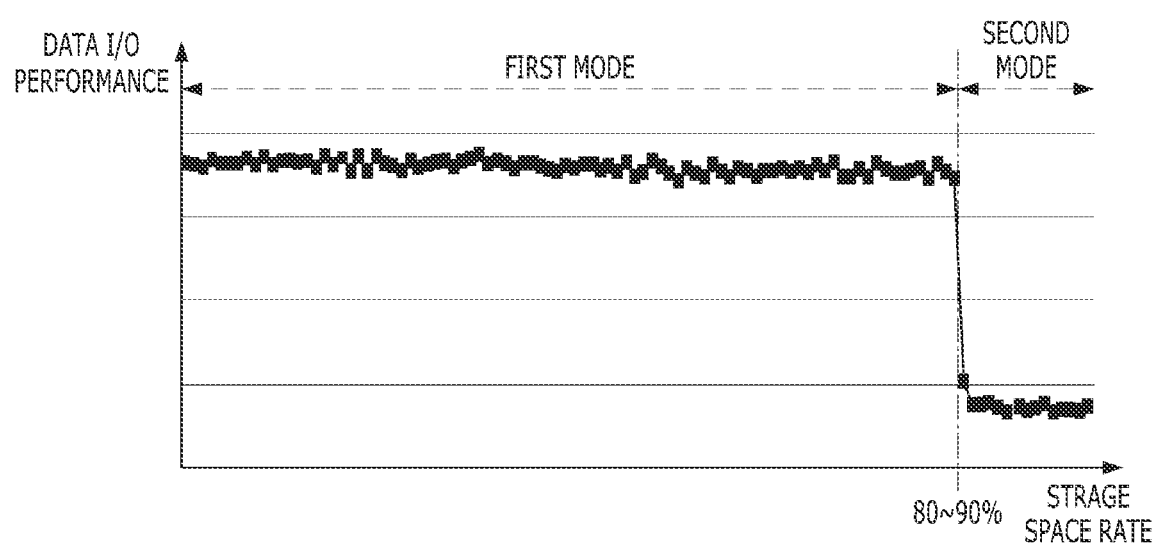
FIG. 6 illustrates a method for determining an operation mode for performing the garbage collection in a memory system according to another embodiment of the disclosure.

FIG. 6 illustrates a method for determining an operation mode for performing the garbage collection in a memory system according to another embodiment of the disclosure, Specifically, FIG. 6 shows a relationship between a data storage ratio and data input/output performance of the memory system 110 (see FIGS. 1 to 3). Here, the data storage ratio may indicate how many memory blocks are used to store data with respect to all memory blocks 60 in the memory device 150 (FIGS. 1 to 3). According to an embodiment, an operation mode for the garbage collection may be determined based on a relationship between the data storage ratio and the data input/output performance.

Referring to FIG. 6, there are two operation modes: a first mode and a second mode. Which of the two operation modes is selected or determined may be based on the data storage ratio. According to an embodiment, the data input/output performance of the memory system 110 may be kept at a constant level without a significant change until the percentage of memory blocks to store data in the memory system 110 reaches to a predetermined criterion (e.g., 80 to 90% of all memory blocks). The percentage at which sharp performance drop of the memory system 110 may differ depending on an operation method and an internal structure of the memory system 110. However, the data input/output performance criterion may be determined through a manufacturing process or a testing process of the memory system 110, For example, when 100 memory blocks are included in the memory device 150, the data input/output performance may be deteriorated after 80 to 90 memory blocks have been already used to store data.

In the first mode, enough free blocks may be included in the memory device 150 of the memory system 110. Thus, in the first mode, an operation, or a process, for maintaining data input/output performance of the memory system 110 has a higher priority than that for securing a new free block. However, when the number of dirty blocks increases and the number of free blocks decreases due to a delay of the garbage collection, the data input/output performance of the memory system 110 may be deteriorated. In the first mode, while maintaining data input/output performance, the controller 130 may perform the garbage collection to defer a time when the memory system 110 enters the second mode. For example, as shown in FIG. 5, in the first mode, the controller 130 can allocate some (a preset ratio of) resources for the garbage collection performed in the memory system, and perform the garbage collection within a constraint that the memory system 110 may maintain the data I/O performance. As the garbage collection is performed, the number of memory blocks storing invalid data in the memory device 150 may be reduced so that a time when a usage ratio of the memory blocks reaches the predetermined criterion (e.g., 80 to 90%) may be delayed.

Even if the garbage collection is performed in the first mode, entry into the second mode may be unavoidable when the amount of data stored in the memory device 150 increases and most of the memory blocks 60 are used to store data. In the second mode, it is necessary to perform the garbage collection to secure a new free block so that the data input/output performance of the memory device 150 may be maintained. For example, as described in FIG. 5, the time or period for performing the garbage collection may be determined to maintain or secure the minimum number of free blocks.

Figure 7:
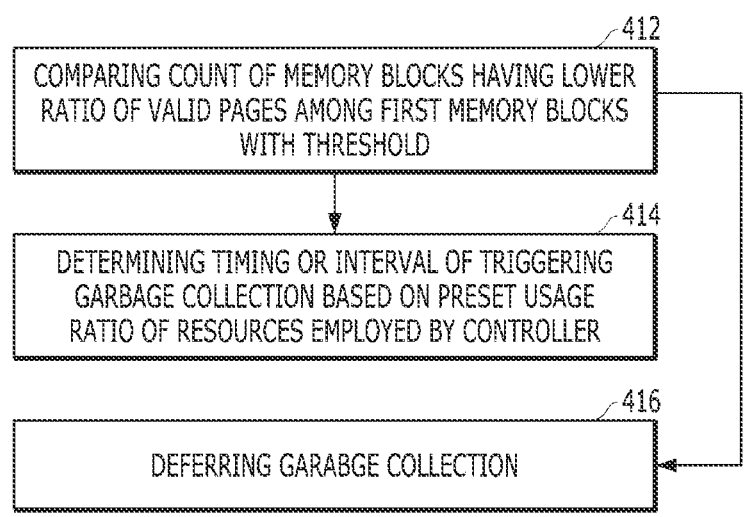
FIG. 7 illustrates a first method for determining a time or period thereof for performing the garbage collection.

FIG. 7 illustrates a first method for determining a time or period for the garbage collection. According to an embodiment, the first method may be used when the memory system 110 is in a first mode among the operation modes for performing garbage collection.

Referring to FIG. 7, the first method for determining the time or period for the garbage collection may include comparing a count of memory blocks, each memory block having a lower ratio of valid pages than a reference, among first memory blocks with a threshold (412). Here, the first memory block may include a dirty block. A dirty block may include at least one page storing invalid data. For example, if there are 100 pages in a dirty block, data stored in one or more pages may be no longer used (i.e., invalid). The garbage collection copies or moves valid data stored in a dirty block to a new memory block. When there is a lot of valid data in a specific dirty block, the garbage collection performed on the specific dirty block needs to copy or move a large amount of valid data to a new memory block, thereby reducing operation efficiency of the garbage collection. Thus, in the first method, it is possible to check a valid data ratio or a valid page ratio of dirty blocks in the memory device 150. The controller 130 may estimate the valid data ratio or the valid page ratio of dirty blocks based on a valid page count (VPC) of each dirty block.

Specifically, the controller 130 may check whether the valid data ratio or the valid page ratio regarding each of the plurality of dirty blocks is equal to or less than a set criterion or ratio. Here, the set criterion may be determined or established to improve the operation efficiency of the garbage collection. A dirty block having a valid page ratio below the set ratio may be a target block subject to the garbage collection. The controller 130 may determine how many dirty blocks have a valid data ratio or a valid page ratio below the set ratio. Thereafter, the controller 130 may compare the number of those dirty blocks with the threshold. Here, the threshold may be one of triggers that may determine whether garbage collection is performed.

When the number of memory blocks subject to the garbage collection in the memory device 150 is larger than, or equal to, the threshold, the controller 130 may perform the garbage collection. Specifically, the first method may include determining a time or period for performing the garbage collection based on a set usage ratio of resources included in, or employed by, the controller 130 (414). For example, in the first mode, the controller 130 may allocate a predetermined ratio of resources for the garbage collection, A garbage collection gradually performed, while the data input/output operations are performed, using the predetermined ratio of resources may be technically distinguished from a garbage collection performed to secure a target number of free blocks. Because it is difficult to determine in advance the number of free blocks obtained through the garbage collection gradually performed based on the predetermined ratio of resources, the controller 130 may perform the garbage collection when the number of memory blocks subject to the garbage collection is larger than or equal to the threshold.

On the other hand, when the number of memory blocks targeted for garbage collection in the memory device 150 is less than the threshold, the controller 130 may defer the garbage collection (416). Even if some resources are allocated for the garbage collection, the operation efficiency of the garbage collection may be reduced when there are no, or insufficient, target memory blocks for garbage collection.

Figure 8:
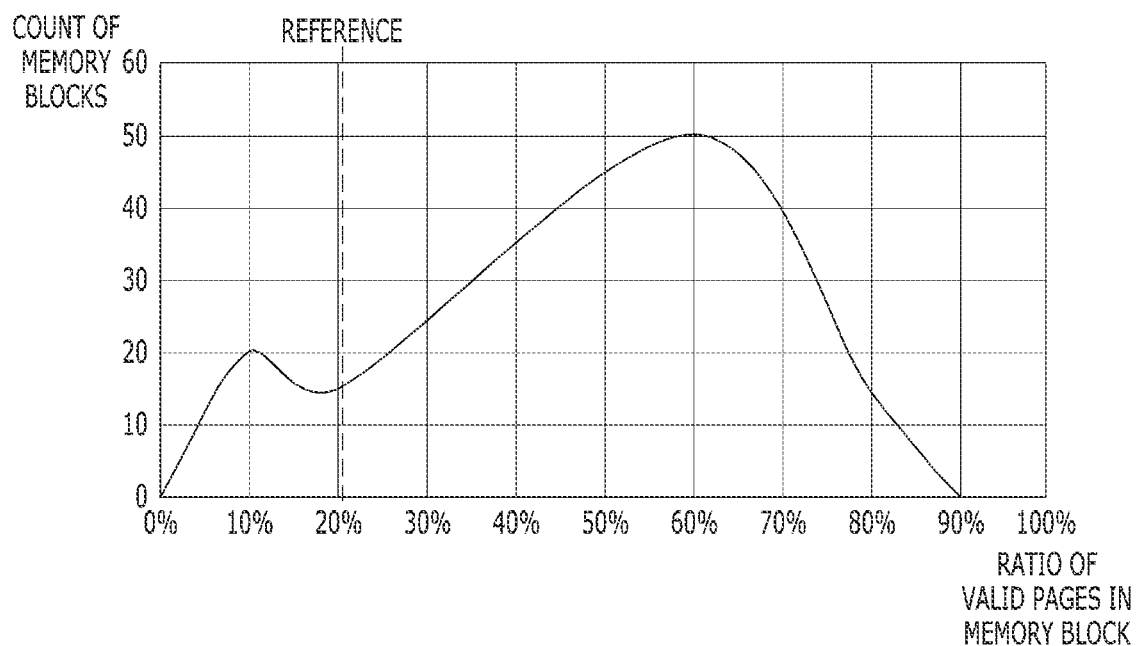
FIG. 8 illustrates an example of a first criterion used for determining whether to perform the garbage collection according to another embodiment of the disclosure.

FIG. 8 illustrates an example of a first criterion used for determining whether to perform the garbage collection according to another embodiment of the disclosure, Here, the first criterion may correspond to a preset criterion related to the valid data ratio or the valid page ratio described in FIG. 7.

Referring to FIG. 8, the controller 130 may detect a distribution regarding a plurality of dirty blocks in the memory device 150 based on operation information regarding the plurality of memory blocks 60 in the memory device 150, The controller 130 may calculate a ratio of valid pages (VP) for each dirty block based on the valid page count (VPC) for each memory block.

It is assumed that distribution of dirty blocks in the memory device 150 is the same as in FIG. 8. For example, the number of dirty blocks including 60% of valid pages may be 50, and the number of dirty blocks including 70% of valid pages may be 40. When the first criterion is 21%, a dirty block having an invalid page ratio less than the first criterion may be a target block subject to the garbage collection. For example, the target blocks subject to the garbage collection may include 15 dirty blocks including 20% of valid pages and 20 dirty blocks including 10% of valid pages. The number of target blocks can be used as a trigger for determining whether to perform the garbage collection described in FIG. 7. For example, it may be assumed that the number of target blocks subject to the garbage collection is 43 and the threshold described in FIG. 7 is 40. The controller 130 may determine a time or period for performing the garbage collection (step 414 shown in FIG. 7). Conversely, it is assumed that the number of target blocks of the garbage collection is 43 and the threshold described in FIG. 7 is 50, the controller 130 may defer the garbage collection (step 416 shown in FIG. 7).

When the memory system 110 performs a data input/output operation, the distribution of dirty blocks may be continuously changed. According to an embodiment, the operation state checker 194 in the controller 130 continuously monitors or tracks the distribution of dirty blocks based on the valid page count (VPC) for each memory block. Also, based on the distribution of dirty blocks, the garbage collection controller 196 may determine whether to perform the garbage collection.

When the memory system 110 determines that the garbage collection is needed, the memory system 110 could decide how often or how long the garbage collection is performed. The memory system 110 may allocate some of resources employed by the memory system 110 or the controller 130 for the garbage collection, so as to perform a data input/output operation corresponding to a request input from the external device, as well as the garbage collection. By the way of example but not limitation, the period for the garbage collection (GC interval) according to a ratio $x_2$ of the allocated resources may be calculated as follows (Equation 1), $$GC\ \text{interval} = (GC\ 1\text{-time}\ NOP) \times \frac{100\% - x_2}{x_2} \quad \text{(Equation 1)}$$

Here, an operation coefficient of the garbage collection (GC 1-time NOP) may be determined based on performance of the garbage collection as well as the data input/output operation according to a request input from the external device. For example, it is assumed that a size of data (4 KB) according to the logical address (LBA) used by the host 102. Based on a unit of operation (NOP) for programming 4 KB data into the memory device 150, the controller 130 may roughly calculate the performance of the data input/output operation corresponding to a request input from the external device. For example, when the controller 130 programs 16 KB data into the memory device, the current data I/O operation may be considered to be 4×NOR The garbage collection performed by the controller 130 may also be calculated based on the unit of operation (NOP) for programming 4 KB data into the memory device 150, For example, in an embodiment, the garbage collection includes a process for reading and programming valid data, so that the garbage collection can be converted into a number of NOPs.

Performance of the garbage collection may be determined based on an internal structure and performance of the memory system 110. According to an embodiment, corresponding to the internal structure and the performance of the controller 130 and the memory device 150, a transmission time may be calculated based on a margin for a program operation and a set size of data. For example, it is assumed that there is one channel between the controller 130 and the memory device 150, the memory device 150 includes two dies, each die has four planes, and each plane includes triple-level memory cells (TLC). Further, a single page of the memory device 150 can store 16 KB data, To increase the operation efficiency, the controller 130 may program a certain amount of data to the memory device 150 at one time (e.g., one-shot program). In the structure of the memory device 150 as described above, an amount of data programmed at one time may be 384 KB (=2×4×3×16). The 384 KB data can be converted into 96 NOP, based on the unit of operation (NOP) for programming the size of data (4 KB) according to the logical address (LBA) used by the host 102.

For example, it is assumed that the garbage collection can be performed once for 10 ms, and a margin for data transmission and program operations ("tProg+tTX (384 KB)" is about 2 ms. The garbage collection performed for 10 ms may be considered 5 program operations (i.e., 10 ms/2 ms). The garbage collection may be converted into 480 NOP (=96×5), based on the size of data (4 KB) according to the logical address (LBA) used by the host 102. Herein, the operation coefficient of the garbage collection (GC 1-time NOP) may be determined as 480 NOP. The operation coefficient of the garbage collection (GC 1-time NOP) can be determined as a conversion value of the garbage collection performed once, based on the unit of operation (NOP) for programming the size of data (4 KB) according to the logical address (LBA) used by the host 102. Based on the operation coefficient of the garbage collection (GC 1-time NOP) and the ratio $x_2$ of the allocated resources, the controller 130 may determine the period or interval of the garbage collection based on the above-described formula (Equation 1).

According to an embodiment, the ratio $x_2$ of the resources allocated for the garbage collection may be determined based on a ratio of data transmission and reception through a data path (e.g., channel) between the controller 130 and the memory device 150. For example, if the ratio $x_2$ of the resources is set to 6%, the ratio of data transmission and reception between the data input/output operation and the garbage collection may be 94:6. That is, 94% of data transmission and reception is made by the data input/output operation.

Figure 9:
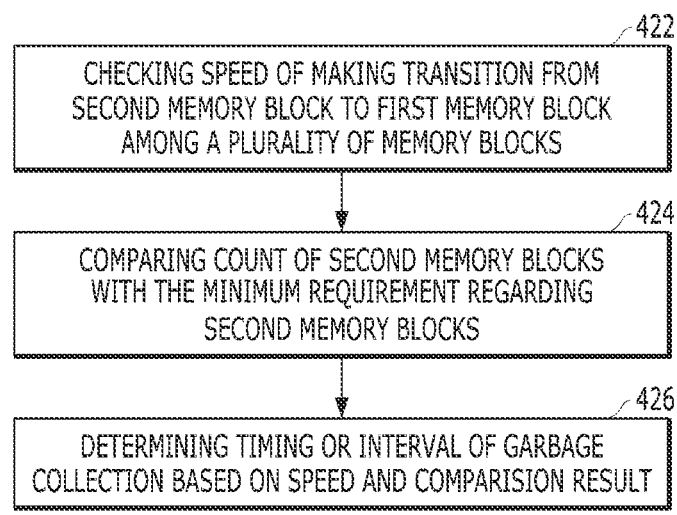
FIG. 9 illustrates a second method for determining the time or period thereof for performing the garbage collection.

FIG. 9 illustrates a second method for determining the time or period for performing the garbage collection, According to an embodiment, the second method may be used in a second mode among the operation modes for the garbage collection.

Referring to FIG. 9, the second method may include checking a speed of transitioning from a second memory block to a first memory block (422). Here, the second memory block may include a free block in the memory device 150, and the first memory block may include a dirty block.

According to an embodiment, the speed of making transition from the second memory block to the first memory block may be replaced with an increased number of first memory blocks for a specific period, which may be the time after a previous garbage collection was completed to the present time. For example, in the second mode, the memory system 110 may try to secure a free block through the garbage collection to avoid deteriorating the operation performance of the memory system 110. The controller 130 may determine the time or period for performing the garbage collection based on the speed of transitioning from a second memory block to a first memory block.

The second method can include comparing the number of the second memory blocks with a minimum requirement (424). For example, based on the number of free blocks in the memory device 150 and the minimum number of free blocks to ensure data input/output performance of the memory system 110, the controller 130 may determine the time or period for performing the garbage collection. The time or the interval for the garbage collection may be associated with how quickly the free blocks are secured.

In addition, the second method may include determining the time or period (interval) for the garbage collection based on the speed of making transition from the second memory block to the first memory block as well as a result of comparing a count of the second memory blocks with the minimum number (426). For example, if the number of the first memory blocks converted from the second memory blocks (that is, from free blocks to dirty blocks) is not large, the garbage collection to secure a new free block need not be performed immediately. On the other hand, if the number of dirty blocks converted from free blocks is large, it is necessary to perform the garbage collection sooner or more frequently to secure a new free block. In addition, when the number of free blocks in the memory device 150 is less than the minimum requirement, the controller 130 could perform the garbage collection with a priority to secure a new free block faster. On the other hand, if the number of free blocks in the memory device 150 is greater than the minimum requirement, the controller 130 can marginally establish the interval for the garbage collection. In the second mode, when the controller 130 determines the time or period (interval) for the garbage collection based on the speed and the comparison result, the minimum requirement regarding a free block to avoid performance drop of the memory system 110 may be satisfied even while the memory system 110 performs the data input/output operation. Through this procedure, it is possible to improve operational stability and reliability of the memory system 110.

Figure 10:
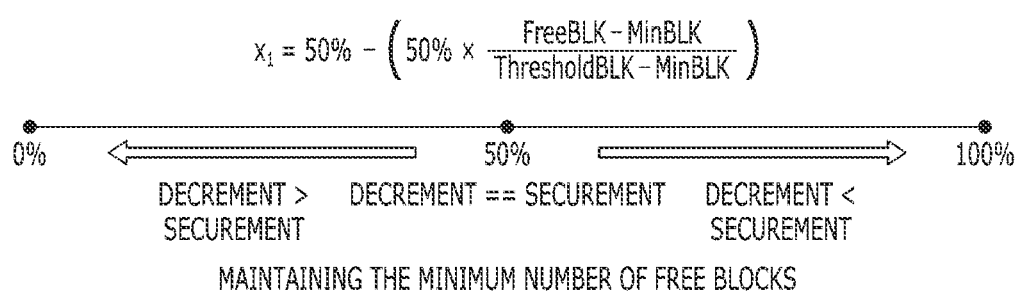
FIG. 10 illustrates an example of a second criterion used for determining whether to perform the garbage collection according to another embodiment of the disclosure.

FIG. 10 illustrates an example of a second criterion used for determining whether to perform the garbage collection according to another embodiment of the disclosure. Here, the second criterion $x_1$ may be a kind of indicators or examples that can correspond to the speed of making transition and the comparison result described in FIG. 9.

Referring to FIG. 10, the controller 130 may calculate the second criterion $x_1$ based on the number of free blocks FreeBLK among the plurality of memory blocks 60 in the memory device 150, the minimum number of free blocks MinBLK for ensuring performance of the memory system 110 and a dirty block threshold ThresholdBLK for determining an operation mode for the garbage collection.

Based on the second criterion $x_1$, the memory system 110 may determine the time or period, i.e., interval, for the garbage collection, to satisfy the minimum requirement regarding free blocks in the memory device 150. According to an embodiment, the second criterion $x_1$ may be obtained determining a first difference between the number of free blocks FreeBLK and the minimum requirement of free blocks MinBLK, determining a second difference between the dirty block threshold ThresholdBLK and the minimum number of free blocks MinBLK, dividing the first difference by the second difference, multiplying the result of that division with the median (50%) and subtracting that multiplied result from the median (50%).

According to an embodiment, the second criterion $x_1$ may be calculated as a value within a range of 0% to 100%. When the second criterion $x_1$ calculated is an intermediate value within the range, e.g., 50%, the interval for the garbage collection may be established to substantially synchronize a first speed of making transition from a free block to a dirty block through data input/output operations with a second speed of securing a new free block through the garbage collection (i.e., two speeds (first and second speeds) are substantially identical). When there is no difference between a speed of consuming the free block and a speed of securing a new free block, the number of free blocks in the memory device 150 may be maintained as is. For example, if the number of free blocks in the memory device 150 at the current time satisfies the minimum requirement of free blocks, the number of free blocks can be maintained even when a data input/output operation is performed. When the number of free blocks can be maintained, it is possible to avoid or prevent deterioration of the operation performance in the memory system 110.

On the other hand, if the second criterion $x_1$ calculated is less than 50%, the time or period (interval) for the garbage collection can be determined so as to slow down a speed of securing a new free block through the garbage collection as compared with a speed of free block decrement, i.e., a speed of transitioning from a free block to a dirty block, to store data through a data input/output operation. For example, when the number of free blocks FreeBLK is larger than the minimum requirement MinBLK, the second criterion $x_1$ may be less than 50%. In this case, the number of free blocks in the memory device 150 might decrease because the speed of consuming free blocks (free block decrement) in the memory device is faster than the speed of securing a new free block. However, even if the number of free blocks in the memory device 150 is reduced, it is possible to avoid or prevent deterioration of the operation performance in the memory system 110 until the number of free blocks FreeBLK are larger than the minimum requirement MinBLK.

When the second criterion $x_1$ calculated is larger than 50%, the time or period (interval) for the garbage collection can be determined to increase the speed of securing a new free block through the garbage collection as compared with a speed of free block decrement to store data through a data input/output operation. For example, when the number of free blocks FreeBLK is less than the minimum requirement MinBLK, the second criterion $x_1$ may be larger than 50%. In this case, the number of free blocks in the memory device 150 might increase because the speed of free block decrement/consumption in the memory device is slower than the speed of securing a new free block. However, even if the number of free blocks FreeBLK in the memory device 150 is less than the minimum requirement MinBLK, it is possible to avoid or prevent deterioration of the operation performance in the memory system 110 because the number of free blocks FreeBLK can satisfy the minimum requirement MinBLK soon.

To calculate the interval for the garbage collection (GC interval), the following equation (Equation 2) can be obtained when the second criterion $x_1$ is applied to Equation 1 described above, $$GC \text{ interval} = (GC \text{ 1-time } NOP) \times \frac{100\% - x_1}{x_1} \quad \text{(Equation 2)}$$

On the other hand, an error may occur when the controller 130 performs the garbage collection based on the interval for the garbage collection (GC interval) calculated through the Equation 2. For example, when the second criterion $x_1$ is 50%, a single new free memory block should be secured when a single free memory block is consumed to store data. However, the number of new free blocks nay be different depending upon how many valid pages are included in the target block subject to the garbage collection because an operation for the garbage collection is varied. Accordingly, the number of new free blocks secured through the garbage collection might not be same as the desired number of new free blocks which is a goal for the garbage collection. Thus, to determine the interval for the garbage collection more accurately, the controller 130 may determine or adjust the interval for the garbage collection (GC interval') through the feedback regarding a result of the garbage collection (GCFeedback shown in FIG. 4). For example, as shown in Equation 3 below, it is necessary to adjust the interval for the garbage collection (GC interval') based on a ratio of valid pages victimVP %, or invalid pages, included in a single target block subject to the garbage collection.

$$GC \text{ interval}' = GC \text{ interval} \times \frac{100 - \text{victim } VP \%}{100} \quad \text{(Equation 3)}$$

For example, the higher the percentage of valid pages included in a target block subject to the garbage collection, the shorter the interval for the garbage collection between two target blocks. Thus, the controller 130 may frequently perform the garbage collection on plural target blocks. Conversely, the lower the percentage of valid pages included in a target block subject to the garbage collection, the longer the interval for the garbage collection between two target blocks. Thus, the controller 130 can lower a frequency at which garbage collection is performed on plural target blocks.

Referring to the Equation 1 and the Equation 2, the memory system 110 according to an embodiment of the disclosure may determine the interval for the garbage collection through a plurality of methods in a plurality of modes. In the Equation 1 and the Equation 2, the roughly calculated operation coefficient of the garbage collection (GC 1-time NOP) may be used. When the controller 130 performs the garbage collection for 10 ms, it may be expected that an amount of data corresponding to 10 times as large as the operation coefficient of the garbage collection (10 ms GC NOP referred as in the Equation 4) may be transferred into another memory block. However, in addition to a program operation, an internal procedure performed in the memory system to complete the garbage collection may include an operation for reading valid data from the memory device 150, searching for a target block in the memory device 150, or updating map information to the controller 130. Because operations associated with or involved in the garbage collection may consume resources (e.g., operation time), an actual amount of data transferred while the garbage collection is performed for 10 ms may be less than the estimated amount of data calculated based on the operation coefficient of the garbage collection (GC 1-time NOP). Therefore, to determine the interval of the garbage collection more accurately, the controller 130 may determine or adjust the interval for the garbage collection again by feeding back the result of the garbage collection (GCFeedback shown in FIG. 4).

For example, the memory system 110 may check a time spent on the garbage collection to a single target block. In addition, an operation coefficient of the garbage collection (GC 1-time NOP) may be calculated based on an amount of data transferred into another memory block during the garbage collection to the target block. Further, garbage collection efficiency (Actual Eff NOP/ms) can be calculated based on the time taken for the garbage collection performed to the target block as well as the operation coefficient obtained from the amount of data transferred. Here, the garbage collection efficiency (Actual Eff NOP/ms) may be obtained whenever the garbage collection is performed to a target block. Through this method, garbage collection execution time (GC Exe time) indicating how long the garbage collection is performed can be determined as shown below in the Equation 4, $$GC \text{ Exe Time} = \frac{10\text{ms } GC \text{ } NOP}{\text{Actual } Eff \text{ NOPs/ms}} \quad \text{(Equation 4)}$$

Referring to the Equation 4, as the garbage collection efficiency (Actual Eff NOP/ms) becomes lower, the garbage collection execution time (GC execution time) may become longer.

Through the above-described method, the controller 130 determines a time or an interval for the garbage collection to secure a new free block in the memory device 150 to slow the increase of dirty blocks used to store data and to maintain a sufficient number of free blocks. The memory system can slow down a rate at which dirty blocks are increased. In addition, even if the dirty block exceeds a certain criterion, the controller 130 may control the memory device 150 to maintain the minimum requirement regarding the free block MinBLK in the memory device 150, This avoids further deterioration of the operation performance of the memory system 110.

The memory system according to an embodiment of the disclosure can independently and stably perform the garbage collection to improve performance of the memory system.

In addition, the memory system according to another embodiment of the disclosure may effectively control the garbage collection to improve data input/output performance of the memory system.

Further, the memory system according to another embodiment of the disclosure may control the garbage collection, based on a clear criterion or a definite condition for performing the garbage collection, to improve operation efficiency of the memory system.

While the present teachings have been illustrated and described with respect to the specific embodiments, it will be apparent to those skilled in the art in light of the present disclosure that various changes and modifications may be made without departing from the spirit and scope of the invention as defined in the following claims.

What is claimed is:

1. A memory system, comprising:
a memory device including at least one first memory block including at least one piece of invalid data and at least one second memory block of which pages are blank; and
a controller, coupled to the memory device via a data path, configured to determine a speed of making a transition from the at least one second memory block to the at least one first memory block based on a change between a first count regarding the at least one first memory block and a second count of the at least one second memory block, determine a time or a period for performing garbage collection based at least on the speed, and perform the garbage collection in the time or period to the at least one first memory block to secure an additional second memory block, the garbage collection including copying valid data from a memory block, which is selected among the at least one first memory block and scheduled to be the additional second memory block, to another memory block in the memory device.

2. The memory system according to claim 1, wherein the controller is further configured to determine an operation mode based on the first count.

3. The memory system according to claim 2, wherein the controller is configured to:
determine the operation mode as a first mode when the first count is less than a threshold; and
determine the operation mode as a second mode when the first count is greater than or equal to the threshold.

4. The memory system according to claim 3, wherein the controller is further configured to determine, in the second mode, the time or the period for performing the garbage collection, based on a comparison result of the second count and a minimum requirement regarding the at least one second memory block.

5. The memory system according to claim 4, wherein the controller is configured to determine, in the second mode, the time or the period for performing the garbage collection to make a speed of securing the additional second memory block slower than the transition speed, when the second count is larger than the minimum requirement regarding the at least one second memory block.

6. The memory system according to claim 4, wherein the controller is configured to determine, in the second mode, the time or period for performing the garbage collection to make a speed of securing the additional second memory block faster than the transition speed, when the second count is less than a minimum requirement regarding the at least one second memory block.

7. The memory system according to claim 4, wherein the controller is configured to determine, in the second mode, the time or period for performing the garbage collection to match a speed of securing the additional second memory block with the transition speed, when the second count is equal to a minimum requirement regarding the at least one second memory block.

8. The memory system according to claim 3, wherein the controller is further configured to determine, in the first mode, the time or period for performing the garbage collection based on a difference between the threshold and a minimum requirement regarding the at least one second memory block.

9. The memory system according to claim 3, wherein the controller is further configured to determine, in the first mode, whether to perform the garbage collection based on a count of memory blocks, each of which has a ratio of valid pages less than a set reference among the at least one first memory block.

10. The memory system according to claim 3, wherein the controller is configured to determine, in the first mode, the time or the period for performing the garbage collection based on a set ratio of resources employed by the controller.

11. The memory system according to claim 10, wherein the controller is further configured to determine the set ratio of resources based on a ratio between a first estimate of time to perform an operation in response to a request input from an external device and a second estimate time to perform the garbage collection.

12. A method for operating a memory system, the method comprising:
determining a speed of making a transition from at least one second memory block of which pages are blank to the at least one first memory block including at least one piece of invalid data based on a change between a first count regarding the at least one first memory block and a second count of the at least one second memory block;
determining a time or a period for performing garbage collection based at least on the speed; and
performing the garbage collection in the time or period to the at least one first memory block to secure an additional second memory block, the garbage collection including copying valid data from a memory block, which is selected among the at least one first memory block and scheduled to be the additional second memory block, to another memory block in the memory device.

13. The method according to claim 12, further comprising:
determining an operation mode based on the first count.

14. The method according to claim 13, wherein the determining the operation mode includes:
determining the operation mode as a first mode when the first count is less than a threshold; and
determining the operation mode as a second mode when the first count is greater than or equal to the threshold.

15. The method according to claim 14, wherein, in the second mode, the time or the period for performing the garbage collection is determined based on a comparison result of the second count and a minimum requirement regarding the at least one second memory block.

16. The method according to claim 15, wherein the determining the time or the period, in the second mode, comprises determining the time or period for performing the garbage collection to make a speed of securing the additional second memory block slower than the transition speed, when the second count is larger than the minimum requirement regarding the at least one second memory block.

17. The method according to claim 15, wherein the determining the time or the period, in the second mode, comprises determining the time or period for performing the garbage collection to make a speed of securing the additional second memory block faster than the transition speed, when the second count is less than a minimum requirement regarding the at least one second memory block.

18. The method according to claim 15, wherein the determining the time or the period, in the second mode, comprises determining the time or period for performing the garbage collection to match a speed of securing the additional second memory block with the transition speed, when the second count is equal to a minimum requirement regarding the at least one second memory block.

19. The method according to claim 14, wherein the determining the time or the period, in the first mode, comprises determining the time or period for performing the garbage collection based on a difference between the threshold and a minimum requirement regarding the at least one second memory block.

20. The method according to claim 14, wherein the determining the time or the period, in the first mode, comprises the time or the period for performing the garbage collection based on a set ratio of resources employed by the memory system.

* * * * *